(12) United States Patent
McEvoy

(10) Patent No.: US 9,237,126 B2
(45) Date of Patent: Jan. 12, 2016

(54) ONE-WAY BUS BRIDGE

(76) Inventor: Gerald R. McEvoy, Manassas, VA (US)

( * ) Notice: Subject to any disclaimer, the term of this patent is extended or adjusted under 35 U.S.C. 154(b) by 53 days.

(21) Appl. No.: 13/229,640

(22) Filed: Sep. 9, 2011

(65) Prior Publication Data

US 2012/0179852 A1 Jul. 12, 2012

Related U.S. Application Data

(60) Provisional application No. 61/381,440, filed on Sep. 9, 2010.

(51) Int. Cl.
*G06F 13/40* (2006.01)
*H04L 29/06* (2006.01)

(52) U.S. Cl.
CPC ........ *H04L 63/0209* (2013.01); *H04L 63/0227* (2013.01); *G06F 13/4027* (2013.01)

(58) Field of Classification Search
USPC ............. 710/306–316; 370/230; 726/3, 4, 26; 709/217, 220, 223, 230
See application file for complete search history.

(56) References Cited

U.S. PATENT DOCUMENTS

| | | | | |
|---|---|---|---|---|
| 5,703,562 A * | 12/1997 | Nilsen | ................... | 340/286.02 |
| 6,115,819 A * | 9/2000 | Anderson | ................... | 726/20 |
| 6,865,672 B1 * | 3/2005 | Carmeli | ................... | 713/155 |
| 6,948,031 B2 * | 9/2005 | Chilton | ................... | 711/113 |
| 7,342,882 B2 * | 3/2008 | Kwon et al. | ................... | 370/232 |
| 7,412,642 B2 * | 8/2008 | Cypher | ................... | 714/776 |
| 7,555,744 B2 * | 6/2009 | Chkodrov et al. | ................... | 717/124 |
| 7,571,269 B2 * | 8/2009 | Schmidt et al. | ................... | 710/105 |
| 7,594,022 B2 * | 9/2009 | Warren et al. | ................... | 709/229 |
| 7,664,836 B2 * | 2/2010 | Kim | ................... | 709/222 |
| 7,675,867 B1 * | 3/2010 | Mraz et al. | ................... | 370/254 |
| 7,840,742 B2 * | 11/2010 | Berland et al. | ................... | 710/315 |
| 7,992,209 B1 * | 8/2011 | Menoher et al. | ................... | 726/26 |
| 8,068,415 B2 * | 11/2011 | Mraz | ................... | 370/230 |
| 8,068,504 B2 * | 11/2011 | Brindle et al. | ................... | 370/401 |
| 8,250,235 B2 * | 8/2012 | Harvey et al. | ................... | 709/237 |
| 8,250,358 B2 * | 8/2012 | Cheng | ................... | 713/153 |
| 8,302,082 B2 * | 10/2012 | Zimmer et al. | ................... | 717/140 |
| 2003/0158906 A1 * | 8/2003 | Hayes | ................... | 709/211 |
| 2005/0269406 A1 * | 12/2005 | Neff | ................... | 235/386 |
| 2007/0208973 A1 * | 9/2007 | Wu et al. | ................... | 714/724 |
| 2008/0259929 A1 | 10/2008 | Mraz | | |
| 2010/0253692 A1 * | 10/2010 | Cheymol et al. | ................... | 345/522 |

OTHER PUBLICATIONS

Mindspeed—"CX28250—ATM Physcial Interface (PHY) Devices"; 215 pages, Dated Dec. 2002.*
Mindspeed—"CN8236—ATM ServiceSAR Plus with xBR Traffic Management"; 443 pages, Dated May 2003.*
Mindspeed—"CN8236—OC-3 ATM SAR Controller with Utopia Level 2"; 4 pages, Dated 2003.*

(Continued)

*Primary Examiner* — Brian Misiura
(74) *Attorney, Agent, or Firm* — John J. Dresch; Dresch IP Law, PLLC

(57) ABSTRACT

A one-way bus bridge pair that transfers secure data in one direction, the bus bridge pair including a transmitting bus bridge, a receiving bus bridge, and a link. The link can connect the transmitting bus bridge and receiving bus bridge. The transmitting bus bridge may be arranged not to receive any data from the receiving bus bridge, and the receiving bus bridge may be arranged not to send any data to the transmitting bus bridge.

63 Claims, 17 Drawing Sheets

(56) References Cited

OTHER PUBLICATIONS

Active and Passive Optical Components for WDM Communication; "Optical Interconnects in Conventional Electronic Computers"—Dated 2001, 12 Pages.*

Agilent Technologies; "Fiber Optic Transmitter and Receiver Data Links for 155 MBd"; Dated 1999, 12 Pages.*
"Secure Data Export and Auditing using Data Diodes"—by Douglas W. Jones and Tom C. Bowersox; 5 pages, No Date Provided.*

* cited by examiner

ONE-WAY BUS BRIDGE

CROSS-REFERENCE TO RELATED APPLICATIONS

The present invention claims the benefit of U.S. Provisional Application No. 61/381,440, filed Sep. 9, 2010, and entitled "ONE-WAY BUS BRIDGE", the entire contents of which are incorporated herein by reference.

FIELD OF THE INVENTION

The present invention relates to a one-way bus bridge, and more specifically, to a one-way bus bridge that securely transfers data in one direction without the capability to transfer or connect in the opposite direction.

BACKGROUND OF THE INVENTION

One-Way data communication transfer systems have been available for quite some time. Typically, they are used to securely transport data from one network domain to a second network domain using a one-way network transport. The typical "network layer" protocols that are utilized for one-way secure data are either User Datagram Protocol (UDP) over Ethernet or Asynchronous Transfer Mode (ATM). FIG. 1 illustrates an example of a conventional one-way data communication network.

In the one-way data communication transfer system illustrated in FIG. 1, two computing platforms 101 and 102 are connected to an unsecured (source) network 107 and a secure (destination) network 113. Source network 107 can be attached to workstation 109, server 111 and computing platform 101. Further, destination network 113 can be connected to workstation 117, server 115 and computing platform 102. Computing platforms 101 and 102 can be connected via a unidirectional data link 103. The unidirectional data link 103 can be implemented to ensure that data is only transferred in one direction such that it is physically impossible to transfer data of any kind in the reverse direction.

Traditionally, unidirectional data transfer systems will convert a file from its native format into data packets in order to transfer it across a one-way network. Once the data is transmitted across the one-way network, it must be reassembled on the receiving system in order to piece the file together back into its original format (prior to writing it to the native device it was intended to go). This makes it very difficult to pass non-file-based data and limits the flexibility of these traditional one-way transfer methods. Furthermore, processing (segmentation and reassembly) of these data packets is typically performed by a network interface card. FIG. 2 illustrates a block diagram of conventional computing platforms 101 and 102. FIG. 2 shows that computing platform 101 has a network interface card 200 and computing platform 102 has a network interface card 210. Each of the network interface cards 200 and 210 interface with busses 208 and 218. Further, network interface card 200 includes an interface circuit/chip 204 and network interface card 210 includes an interface circuit/chip 214. The interface circuit/chip 204 and 214 process (segmentation and reassembly) data packets. Therefore, the overall system speed is lowered from the additional data overhead and additional processing employed from each of the network interface cards. Although network speeds are advancing, they are still not fast enough for certain applications and for higher volumes of data. There is currently no capability within the traditional network-based one-way transfer implementation to directly communicate cross-domain to a device on another computer.

While there are numerous vendors that have built customized fiber optic capable boards as well as utilized standard twisted-pair using media converters to achieve a unidirectional capability, these traditional methods will become obsolete as technology advances and the need for greater flexibility, higher speeds and greater capacity increases.

SUMMARY OF THE INVENTION

The present invention recognizes that a need exists for a method of securely transporting data in native format, across network domains at significantly faster speeds. Further, the present invention recognizes that a need exists for a new level of functionality and capability that currently does not exist with these unidirectional network systems. The present invention recognizes that yet another need exists for a method of transferring data across a one-way link by utilizing the bus architecture of the system yielding better data transfer speeds across the one-way link.

The aforementioned problems and others are addressed by the present invention, a first exemplary embodiment of which includes a one-way bus bridge pair that transfers data securely in one direction. The bus bridge pair can include a transmitting bus bridge, a receiving bus bridge, and a link. The link can connect the transmitting bus bridge and receiving bus bridge. The transmitting bus bridge may be arranged not to receive any data from the receiving bus bridge, and the receiving bus bridge may be arranged not to send any data to the transmitting bus bridge.

Another embodiment may also include a transmitting bus bridge that includes a transmitter and the receiving bus bridge can include a receiver. The transmitter may be connected to a first bus via a first interface and the receiver can be connected to a second bus via a second interface. The transmitter can include a controlling device that can control the link. The receiver can include a controlling device that can control the link. The controlling device can include a logic device. The logic device can include a field programmable gate array (FPGA).

In yet another embodiment, the transmitter may receive an input data from the first bus of a first computing device, and may send the input data to the receiver via the link. The receiver may receive the input data from the link, and may send the input data to the second bus of a second computing device. The link can include a single direction fiber optic connection, a copper cable connection and/or a wireless connection.

Another embodiment may include input data that includes a command from a device driver. The device driver can support a UNIX-based operating system, a Linux-based operating system, a Microsoft Windows-based operating system, and an Apple-based operating system. The device driver can include a pseudo-device. The pseudo-device can include a disk drive, a memory device, an audio device, a video device, a network device, and a memory mapping device.

Another embodiment may also include a Peripheral Component Interconnect (PCI) interface, a Peripheral Component Interconnect Express (PCIe) interface, a mini-Peripheral Component Interconnect Express (PCIe) interface, or an InfiniBand interface. The device driver supports a UNIX-based operating system, a Linux-based operating system, a Microsoft Windows-based operating system, and an Apple-based operating system.

Another embodiment may also include a one-way bus bridge pair that transfers secure data in one direction. The bus bridge pair can include a transmitting bus bridge, a receiving bus bridge, and a first link. The first link can connect the transmitting bus bridge and receiving bus bridge. The transmitting bus bridge may be arranged not to receive any data from the receiving bus bridge via the first link, and the receiving bus bridge may be arranged not to send any data to the transmitting bus bridge via the first link. The bus bridge pair can also include a second link. The second link can connect the transmitting bus bridge and receiving bus bridge. The receiving bus bridge can be arranged not to receive any data from the transmitting bus bridge via the second link, and the transmitting bus bridge can be arranged not to send any data via the second link to the receiving bus bridge. The second link can carry an acknowledgement data type and/or an error code data type. The acknowledgement data type and the error code data type can cause a retransmission of data across the first link. The acknowledgement data type and the error code data type can include a single byte of data.

Yet in another embodiment, a secure one-way bus bridge system can include a transmitting bus bridge, a receiving bus bridge, and a link. The link can connect the transmitting bus bridge and receiving bus bridge. The transmitting bus bridge may be arranged not to receive any data from the receiving bus bridge, and the receiving bus bridge may be arranged not to send any data to the transmitting bus bridge.

Another embodiment may also include a transmitting bus bridge that includes a transmitter and the receiving bus bridge can include a receiver. The transmitter may be connected to a first bus via a first interface and the receiver can be connected to a second bus via a second interface. The transmitter can include a controlling device that can control the link. The receiver can include a controlling device that can control the link. The controlling device can include a logic device. The logic device can include a field programmable gate array (FPGA).

Another embodiment can include a method of securely transporting data in native format one-way across two or more computing systems, including providing a transmitting bus bridge, providing a receiving bus bridge, providing a link, wherein the link can connect the transmitting bus bridge and receiving bus bridge, and configuring the link. The transmitting bus bridge can be arranged not to receive any data from the receiving bus bridge, and the receiving bus bridge can be arranged not to send any data to the transmitting bus bridge. The transmitting bus bridge can include a transmitter, and the receiving bus bridge can include a receiver.

In another embodiment, the method can also include connecting the transmitter to a first bus via a first interface, and connecting the receiver to a second bus via a second interface.

In yet another embodiment, the method can also include receiving an input data from the first bus of a first part of a computing device, sending the input data to the receiver via the link, receiving the input data from the link, and sending the input data to the second bus of a second part of the computing device.

In another embodiment, the method can also include receiving an input data from the first bus of a first computing device, sending the input data to the receiver via the link, receiving the input data from the link, and sending the input data to the second bus of a second computing device.

According to the exemplary embodiments, the present invention can provide a method of securely transporting data in native format at significantly faster speeds. Further, the present invention can provide a new level of functionality and capability that currently does not exist with the conventional unidirectional network systems. The present invention can provide a method of transferring data across a one-way link (e.g., a universal bus link or one-way bus link) by utilizing the bus architecture of the system yielding better data transfer speeds across the one-way link. The present invention can communicate across multiple platforms via a one way bus between non-protected and protected systems (which may or may not reside on separate network domains).

In an embodiment, a simple memory write on a first computing system can transfer raw data across a unidirectional link from the first computing system to another computing system. Further, memory writes can occur at tremendous speeds and an exemplary device may only be slowed by the rest of the hardware on the computing system.

In another embodiment, operating system-level control can be provided from one computing system to another computing system via the one-way bus bridge.

In yet another embodiment, an application (located on one computing system) can provide data, commands or control to another application, a driver or operating system (residing on a separate computing system) through the use of the one-way bus bridge.

In an embodiment, the one-way bus bridge can create pseudo-devices, located on one computing system, which map to real devices located on a completely separate computing system. In another embodiment, the one-way bus bridge can create pseudo-devices including a one-way hard drive, a one-way video card, a one-way sound card, a one-way printer and one-way memory.

Furthermore, the exemplary embodiments disclosed herein can be used to protect Personally Identifiable Information (PII) data, credit card numbers, identifiable information for business transactions, monetary transactions or any transaction that needs to be protected from one system or network.

The exemplary embodiments disclosed herein can also be used for continuance of operation (COOP), disaster recovery or one-way data replication.

The exemplary embodiments disclosed herein can be used for various applications, including Government, SCADA, Financial, and/or Large Corporations.

The exemplary embodiments disclosed herein can provide, for example, Secure Information Sharing, Security and Separation, Data Backups, and/or Database Replication.

The exemplary embodiments disclosed herein can depend from the system bus and not network technology like conventional network-level devices.

For purposes of this disclosure, a unidirectional data link can include, for example, a unidirectional bus link and/or unidirectional link.

Other features and advantages of the present invention will become apparent to those of ordinary skill in the art upon review of the following detailed description and drawings.

BRIEF DESCRIPTION OF THE DRAWINGS

Other features and advantages of the present invention will become apparent to those skilled in the art upon review of the following detailed description and drawings.

These and other aspects and features of embodiments of the present invention will be better understood after a reading of the following detailed description, together with the attached drawings, wherein.

DETAILED DESCRIPTION OF THE EXEMPLARY EMBODIMENTS OF THE PRESENT INVENTION

Figure 1:
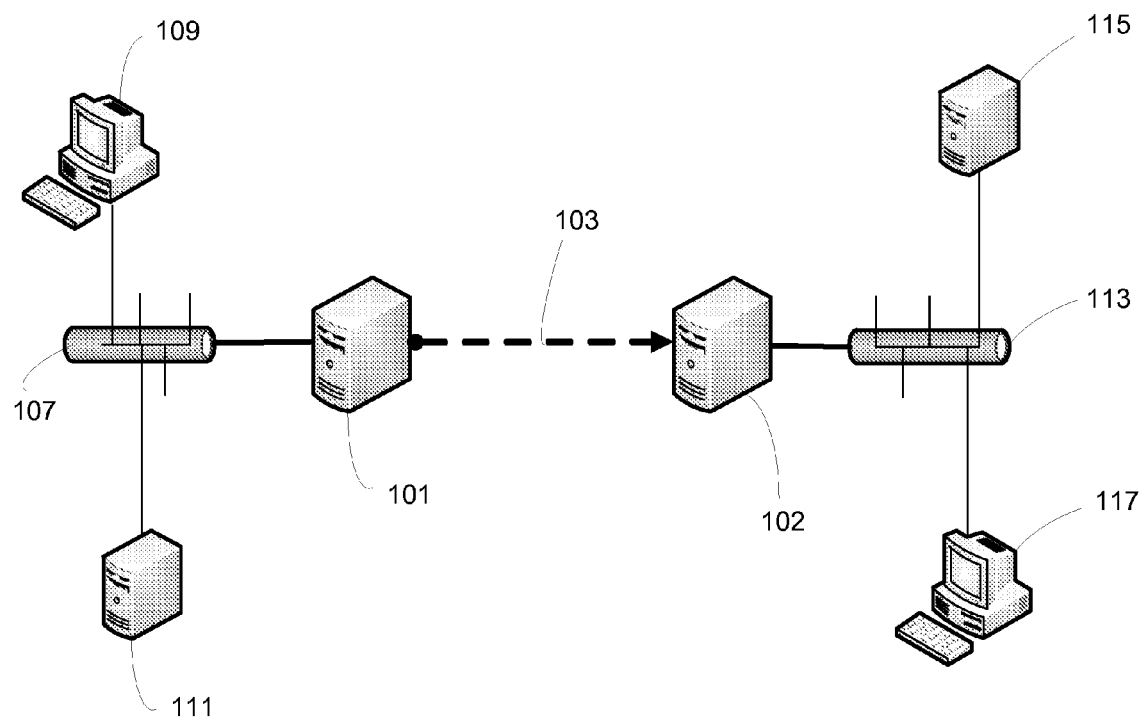
FIG. 1 illustrates an example of a conventional one-way data communication network.
Figure 2:
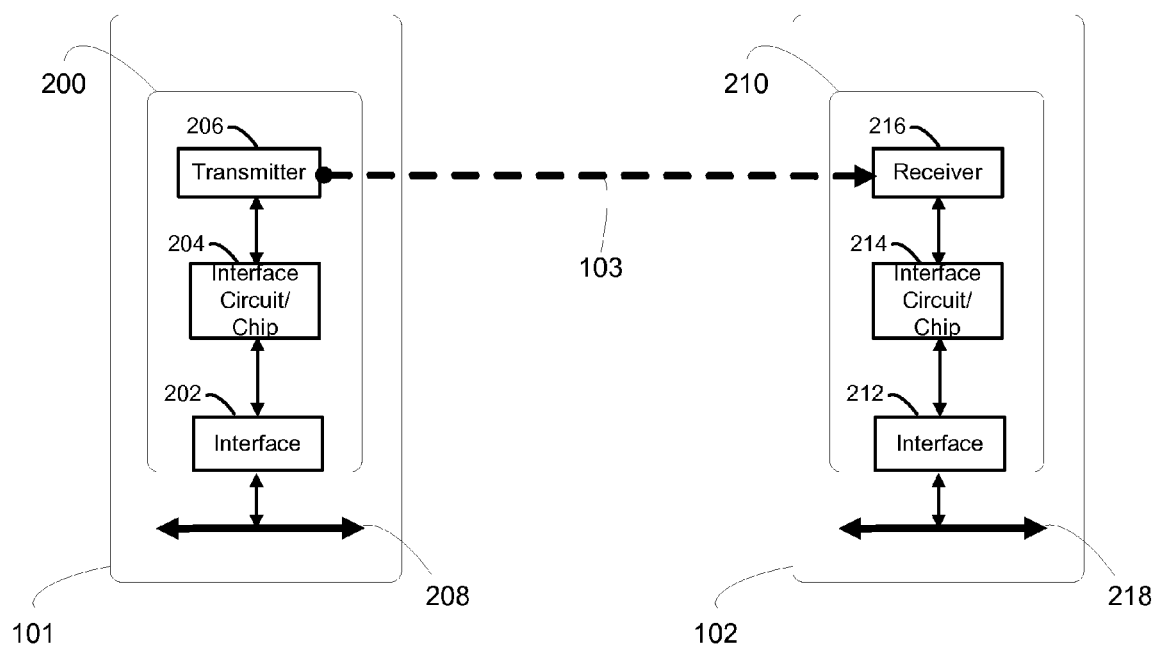
FIG. 2 illustrates an example of a block diagram of conventional computing platforms 101 and 102 illustrated in FIG. 1 in more detail.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Referring now to the drawings, FIGS. 3-11 illustrate exemplary aspects of a one-way bus bridge in accordance with at least one embodiment of the invention.

Figure 3A:
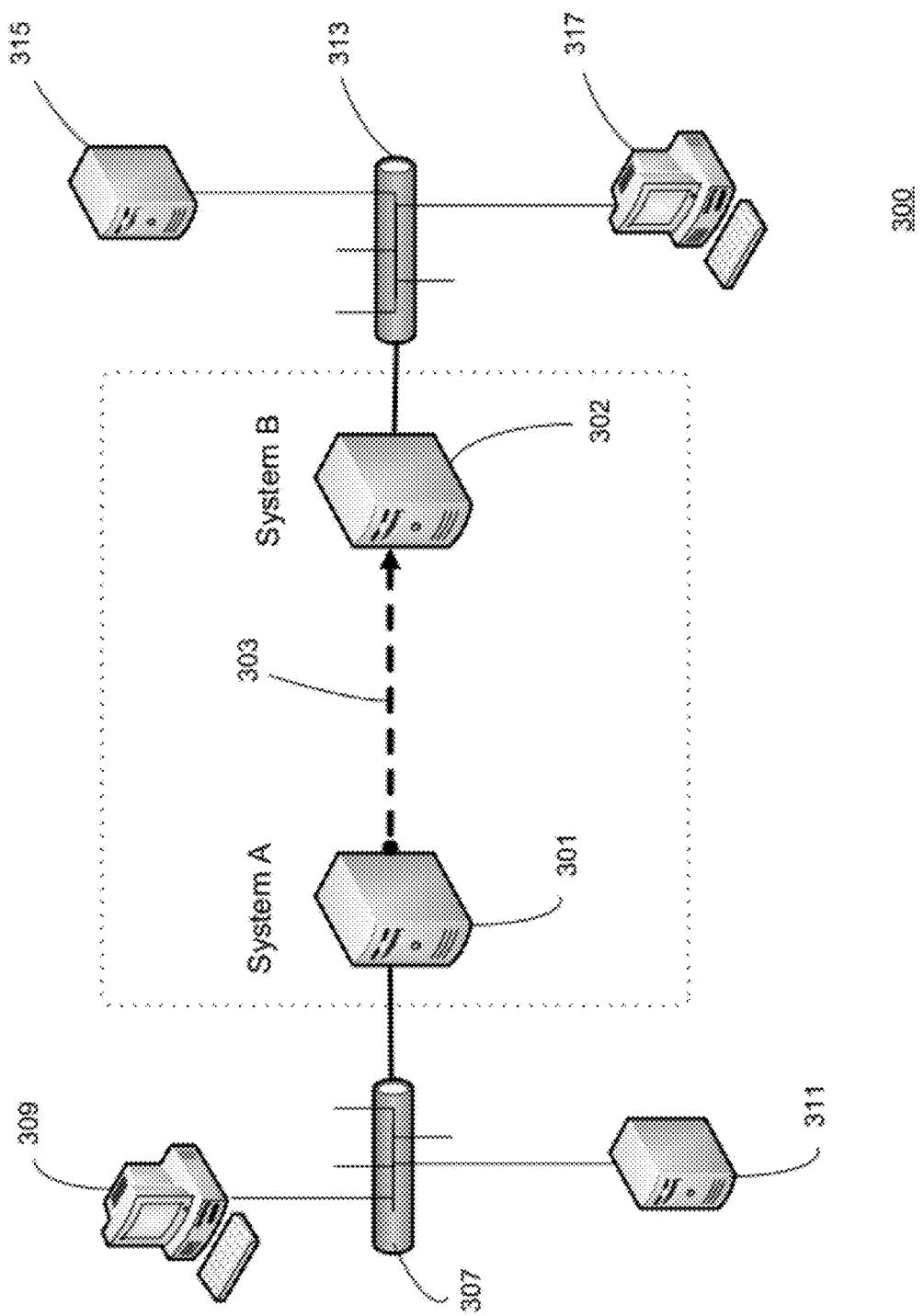
FIG. 3A illustrates a network diagram of an exemplary unidirectional secure data transfer system 300 in accordance with at least one embodiment of the invention.

FIG. 3A illustrates a network diagram of one exemplary embodiment of a unidirectional secure data transfer system 300 in accordance with at least one embodiment of the invention. The unidirectional secure data transfer system 300 may operate on various operating systems or computing platform types, including Microsoft Windows and the Unix-based operating systems (e.g., Solaris, Ultrix and Linux).

Referring to FIG. 3A, source network 307 can be attached to workstation 309, server 311 and computing system 301. Further, destination network 313 can be connected to workstation 317, server 315 and computing system 302. Computing system 301 and 302 can be connected via a unidirectional data link 303. The unidirectional data link 303 can be implemented to ensure that data is only transferred in one direction such that it is physically impossible to transfer data of any kind in the reverse direction. The source network 307 can be connected to the destination network 313 via the unidirectional link 303. In some applications, the destination network 313 can be located on a secure or isolated network in order to ensure that any data located on the secure side is protected from any sort of threats that may be located external to the destination network 313 (for example on the source network 307 side). The transferred data may be in native format with minimal processing and overhead added to ensure maximum throughput.

The unidirectional data link 303 (e.g., a unidirectional bus link) may use any transmission medium type; e.g. fiber optic cabling, any wired cabling, and any wireless link type(s). Furthermore, the unidirectional data link 303 may also use any shielded twisted-pair cabling, any copper cabling, and/or encrypted wireless data links.

For example, the unidirectional data link 303 may be based on different wireless technologies, such as code division multiple access (CDMA), WCDMA, time division multiple access (TDMA), frequency division multiple access (FDMA), Orthogonal Frequency Division Multiplexing (OFDM), Bluetooth, Infrared (IR), or the like, or other protocols that may be used in a wireless communications network or a data communications network. In an embodiment, the unidirectional link can be implemented to physically connect the busses of two separate computing systems (e.g., computing system 301 and 302). Accordingly, the exemplary illustrations provided herein are not intended to limit the embodiments of the invention and are merely to aid in the description of aspects of the exemplary embodiments of the invention.

Referring back to FIG. 3A, the components of the unidirectional secure data transfer system 300 and interrelation of the elements of the exemplary embodiments of the invention are not limited to the configuration illustrated. System 300 is merely exemplary and can include any system that allows any computing devices, such as computing systems 301 and 302, to communicate between and among each other and/or between and among components connected via the unidirectional data link 303. Further, the source network 307 and/or destination network 313 may include any number of networks and/or any number of devices attached to each network and/or any other type of computing devices. For example, the unidirectional link 303 may include a plurality of unidirectional data links (e.g., unidirectional bus links) connecting one or more transmitting bus bridges 321 and/or one or more receiving bus bridges 331, in one or more devices and/or systems.

Figure 3B:
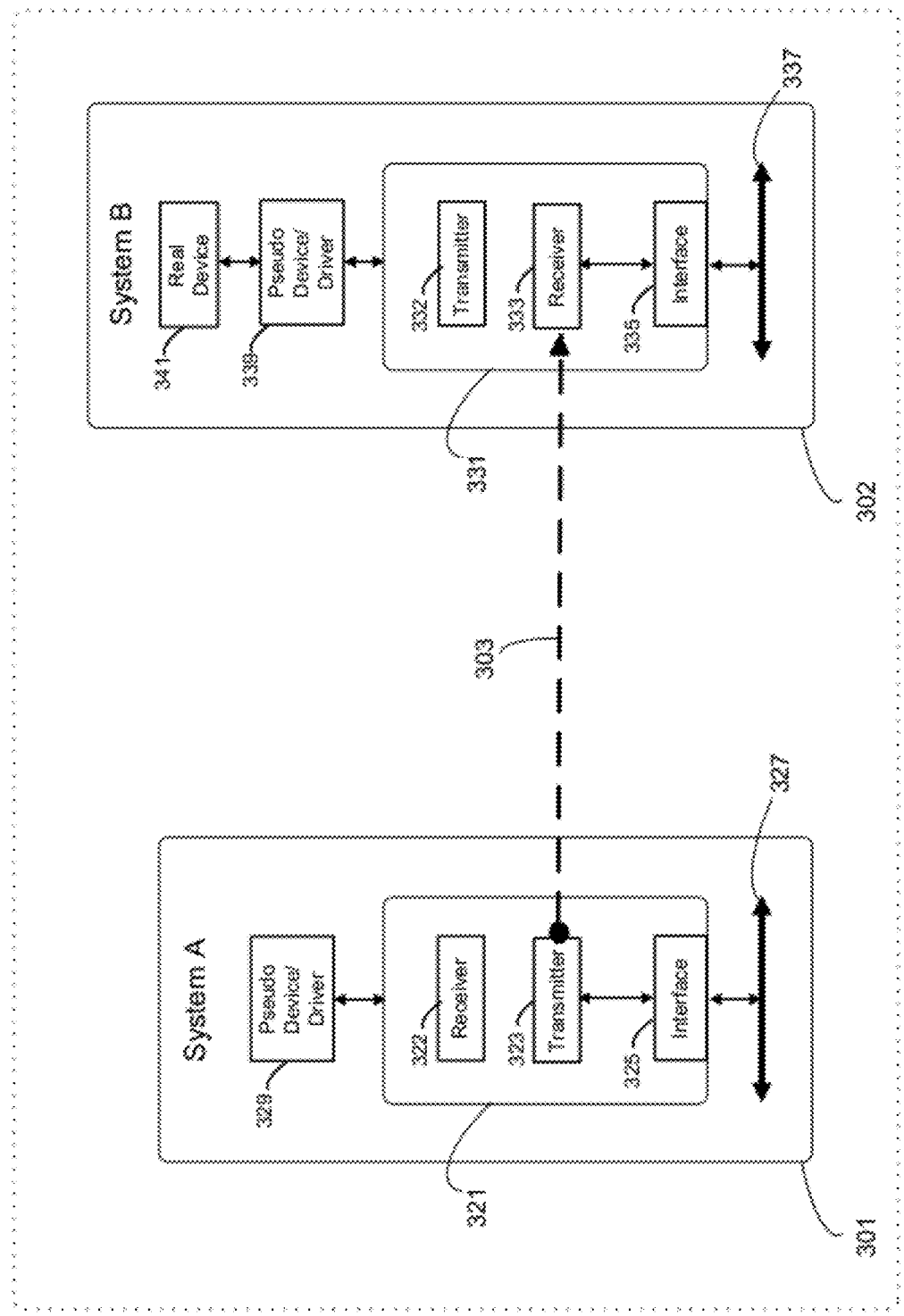
FIG. 3B illustrates an example of a block diagram of the exemplary computing system 301 and 302 of FIG. 3A in more detail.

FIG. 3B illustrates an example of a block diagram of the computing system 301 and 302 of FIG. 3A in more detail.

Referring to FIG. 3B, a user and/or software program of computing system 301 can transfer data from computing system 301 to computing system 302 via the unidirectional link 303; however, computing system 301 cannot receive data from computing system 302 via the unidirectional link 303.

Computing system 301 can include a transmitting bus bridge 321, a bus 327 and pseudo device/drivers 329. Computing system 302 can include a receiving bus bridge 331, a bus 337, pseudo device/drivers 339 and a real device 341. The transmitting bus bridge 321 can be used to connect to the receiving bus bridge 331 yielding a connection between computing system 301 and computing system 302 across link 303.

In an embodiment, the transmitting bus bridge 321 may be configured to be a transmit-only device and/or the receiving bus bridge 331 may be configured to be a receive-only device. In another embodiment, the transmitting bus bridge 321 may be configured to be a transmit/receive device and/or the receiving bus bridge 331 may be configured to be a transmit/receive device such that data may be sent from the transmitting bus bridge 321 to the receiving bus bridge 331, and a small quantity of data (i.e. an acknowledgement) may be sent from the receiving bus bridge 331 to the transmitting bus bridge 321 via link 303 or via another unidirectional link (shown in FIG. 10A as 1003).

The transmitting bus bridge 321 can connect to computing system 301 via the bus 327. In an embodiment, the transmitting bus bridge 321 can include a commercial off-the-shelf (COTS) circuit board. In another embodiment, the transmitting bus bridge 321 can include a custom-made circuit board.

The bus 327 can provide bus data transmissions for the (unsecure) computing system 301. The bus 327 can also be isolated from the (secure) computing system 302 including bus 337. Further, the bus 327 can provide an unsecure computing environment for computing system 301 and any devices attached to bus 327.

Pseudo-device/drivers 329 may allow an application to interact with any devices/systems attached to the bus 327. In an embodiment, pseudo-device/drivers 329 may allow an application to interact with the transmitting bus bridge 321 via bus 327. Pseudo-device/drivers 329 may include custom written software drivers for system 300. Pseudo-device/drivers 329 can include a single pseudo-device/driver and/or a multiple number of pseudo-devices/drivers. Further, pseudo-device/drivers 329 can interact with a single transmitting bus bridge 321 or a plurality of transmitting bus bridges 321.

Figure 3C:
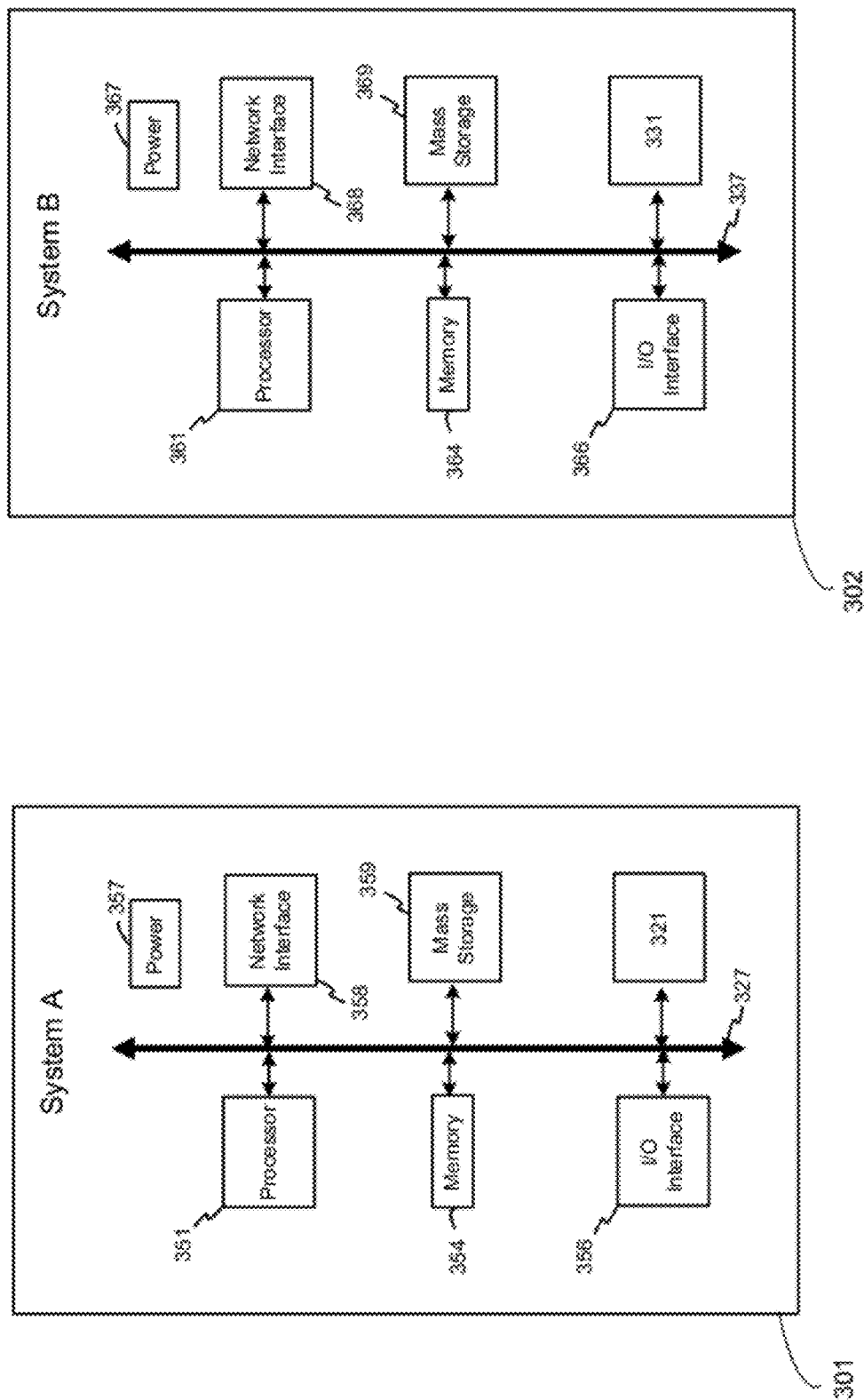
FIG. 3C illustrates an example of a block diagram of the exemplary embodiment(s) of FIGS. 3A-3B in more detail.

Pseudo-device/drivers 329 can be stored/executed within processor 351, memory 354 and/or mass storage 359 (Shown in FIG. 3C).

The transmitting bus bridge 321 can include a transmitting bus bridge (TBB) transmitter 323, an interface 325 and a TBB receiver 322. The interface 325 can provide a direct or indirect connection between the bus 327 and the transmitting bus bridge 321. The interface 325 can also provide a direct or indirect connection between the bus 327 and the TBB transmitter 323. The interface 325 can include any standard bus connection such as, for example, Peripheral Component Interconnect (PCI), PCI Express, mini-PCI Express, Infiniband, and/or Field Programmable Gate Array (FPGA).

Pinouts can be utilized in order to provide electrical contact between one or more electrical devices. In an embodiment, pinouts can be located in/on the transmitting bus bridge 321 (within the interface 325, TBB transmitter 323 and/or TBB receiver 322) and/or in/on the bus 327. In an example embodiment, the physical receive pin-outs on the transmit bus may not be connected such that no data can be received on the transmit board and that the physical transmit pin-outs on the receive bus are not connected such that no data can be transmitted.

The TBB transmitter 323 can include any optical, wired and wireless transmitters. The TBB receiver 322 can include any optical, wired and wireless receivers.

In an embodiment, the unidirectional data link 303 can be implemented to ensure that data is only transferred in one direction such that it is physically impossible to transfer data of any kind in the reverse direction. For example, the transmitting bus bridge 321 can be arranged not to receive any data from the receiving bus bridge 331. In an embodiment, the TBB receiver 322 may not be connected to any pinouts or may not be connected to a sufficient number of pinouts to provide proper electrical contact. In another embodiment, the TBB receiver 322 may not contain any pinouts or may not contain a sufficient number of pinouts to provide proper electrical contact. In yet another embodiment, the transmitting bus bridge 321 may not contain a receiver. In another embodiment, the TBB receiver 322 may have its pinouts disabled.

Computing system 302 can include a receiving bus bridge 331, a bus 337, pseudo device/drivers 339 and a real device 341. The receiving bus bridge 331 can connect to computing system 302 via the bus 337. In an embodiment, the receiving bus bridge 331 can include a COTS circuit board. In another embodiment, the receiving bus bridge 331 can include a custom-made circuit board.

The bus 337 can provide bus data transmissions for the (secure) computing system 302. The bus 337 can also be isolated from the (unsecure) computing system 301 including bus 327. Further, the bus 337 can provide a secure computing environment for computing system 302 and any devices attached to bus 337.

Pseudo-device/drivers 339 may allow application(s) to interact with any devices/systems attached to the bus 337. In an embodiment, pseudo-device/drivers 339 may allow application(s) to interact with the receiving bus bridge 331 via bus 337. In an embodiment, pseudo-device/drivers 339 may also allow application(s) to interact with any real devices 341 via bus 337. For example, the real devices 341 may include video cards, sound cards, network cards, memory cards, and/or disks. Pseudo-device/drivers 339 may include custom written software drivers for system 300. Pseudo-device/drivers 339 can include a single pseudo-device/driver and/or a multiple number of pseudo-device/drivers. Further, pseudo-device/drivers 339 can interact with a single receiving bus bridge 331 or a plurality of receiving bus bridges 331. In an embodiment, pseudo-device/drivers 339 may also allow real devices 341 to interact with the receiving bus bridge 331 via bus 337. Pseudo-device/drivers 339 can be stored/executed within processor 361, memory 364 and/or mass storage 369 (Shown in FIG. 3C).

In an embodiment, any applications on the receiving side can interface with any of the real devices 341 via the local bus 337. Real devices 341 can be mapped by a mapper to any number of pseudo-device/drivers 339. The applications can communicate with the real devices 341 and can create a transparent user experience even though any data delivered from the real devices 341 to the applications came from a totally different computing system 301 or bus 327 via transmitting bus bridge 321 and receiving bus bridge 331.

The receiving bus bridge 331 can include a receiving bus bridge (RBB) receiver 333, an interface 335 and a RBB transmitter 332. The interface 335 can provide a direct or indirect connection between the bus 337 and the receiving bus bridge 331. The interface 335 can also provide a direct or indirect connection between the bus 337 and the RBB receiver 333. The interface 335 can include any standard bus connection such as, for example, PCI, PCI Express, mini-PCI Express, Infiniband, and/or FPGA.

Pinouts can be utilized in order to provide electrical contact between one or more electrical devices. In an embodiment, pinouts can be located in/on the receiving bus bridge 331 (within the interface 335, RBB receiver 333 and/or RBB transmitter 332) and/or in/on the bus 337. In an example embodiment, the physical receive pin-outs on the transmit bus may not be connected such that no data can be received on the transmit board and that the physical transmit pin-outs on the receive bus are not connected such that no data can be transmitted.

The RBB receiver 333 can include any optical, wired and wireless receivers. The RBB transmitter 332 can include any optical, wired and wireless transmitters.

In an embodiment, the unidirectional data link 303 can be implemented to ensure that data is only transferred in one direction such that it is physically impossible to transfer data of any kind in the reverse direction. For example, the receiving bus bridge 331 can be arranged not to transmit any data to the transmitting bus bridge 321. In an embodiment, the RBB transmitter 332 may not be connected to any pinouts or may not be connected to a sufficient number of pinouts to provide proper electrical contact. In another embodiment, the RBB transmitter 332 may not contain any pinouts or may not contain a sufficient number of pinouts to provide proper electrical contact. In yet another embodiment, the receiving bus bridge 331 may not contain a transmitter. In another embodiment, the RBB transmitter 332 may have its pinouts disabled.

FIG. 3C illustrates an example of a block diagram of the exemplary embodiment(s) of FIGS. 3A-3B in more detail.

Referring to FIG. 3C, the computing system 301 may include a processor 351, a system bus 327, a mass storage unit 359, an Input/Output (I/O) interface 356, a memory unit 354, a network interface 358, and a power unit 357. The processor 351 may interface with memory 354 and the mass storage unit 359 via the system bus 327. The memory 354 and/or the mass storage unit 359 may contain executable instructions and data for implementing various operations for performing the operation of computing system 301 described herein. The network interface 358 may interface with the processor 351 over the system bus 327, and can provide an interface for communication with any available external networks. Transmitting bus bridge 321 may be connected to system bus 327 such that the system bus 327 may provide access to other areas of computing system 301. The I/O interface 356 may be provided to permit a user to interface with any external buttons of computing system 301 such as a standard QWERTY keyboard/keypad and/or control stick/mouse. For example, the processor 351 may be an x86 based CPU, and utilize any operating system which may include varieties of the Windows, Unix and/or Linux operating systems. Computing system 301 may also use high-level analysis software packages and/or custom software written in any programming and/or scripting languages.

The memory 354 can include an application specific integrated circuit ("ASIC"), or other processor, microprocessor, logic circuit, or other data processing device. The ASIC or other processor can execute an application programming interface ("API") layer that interfaces with any resident programs in the memory 354 of the device. The memory 354 can be comprised of read-only or random-access memory (RAM and ROM), EEPROM, flash cards, or any memory common to computer platforms.

Computing system 302 may include a processor 361, a system bus 337, a mass storage unit 369, an I/O interface 366, a memory unit 364, a network interface 368, and a power unit 367. The processor 361 may interface with memory 364 and the mass storage unit 369 via the system bus 337. The memory 364 and/or the mass storage unit 369 may contain executable instructions and data for implementing various operations for performing the operation of computing system 302 described herein. The network interface 368 may interface with the processor 361 over the system bus 337, and can provide an interface for communication with any available external networks. Receiving bus bridge 331 may be connected to system bus 337 such that the system bus 337 may provide access to other areas of computing system 302. The I/O interface 366 may be provided to permit a user to interface with any external buttons of computing system 302 such as a standard QWERTY keyboard/keypad and/or control stick/mouse. For example, the processor 361 may be an x86 based CPU, and utilize any operating system which may include varieties of the Windows, Unix and/or Linux operating systems. Computing system 302 may also use high-level analysis software packages and/or custom software written in any programming and/or scripting languages.

The memory 364 can include an ASIC, or other processor, microprocessor, logic circuit, or other data processing device. The ASIC or other processor can execute an API layer that interfaces with any resident programs in the memory 364 of the device. The memory 364 can be comprised of read-only or random-access memory (RAM and ROM), EEPROM, flash cards, or any memory common to computer platforms.

Further, the features of computing system 301 and/or computing system 302 shown in FIG. 3C are to be considered merely illustrative and the invention is not limited to the illustrated features or arrangement.

Figure 4A:
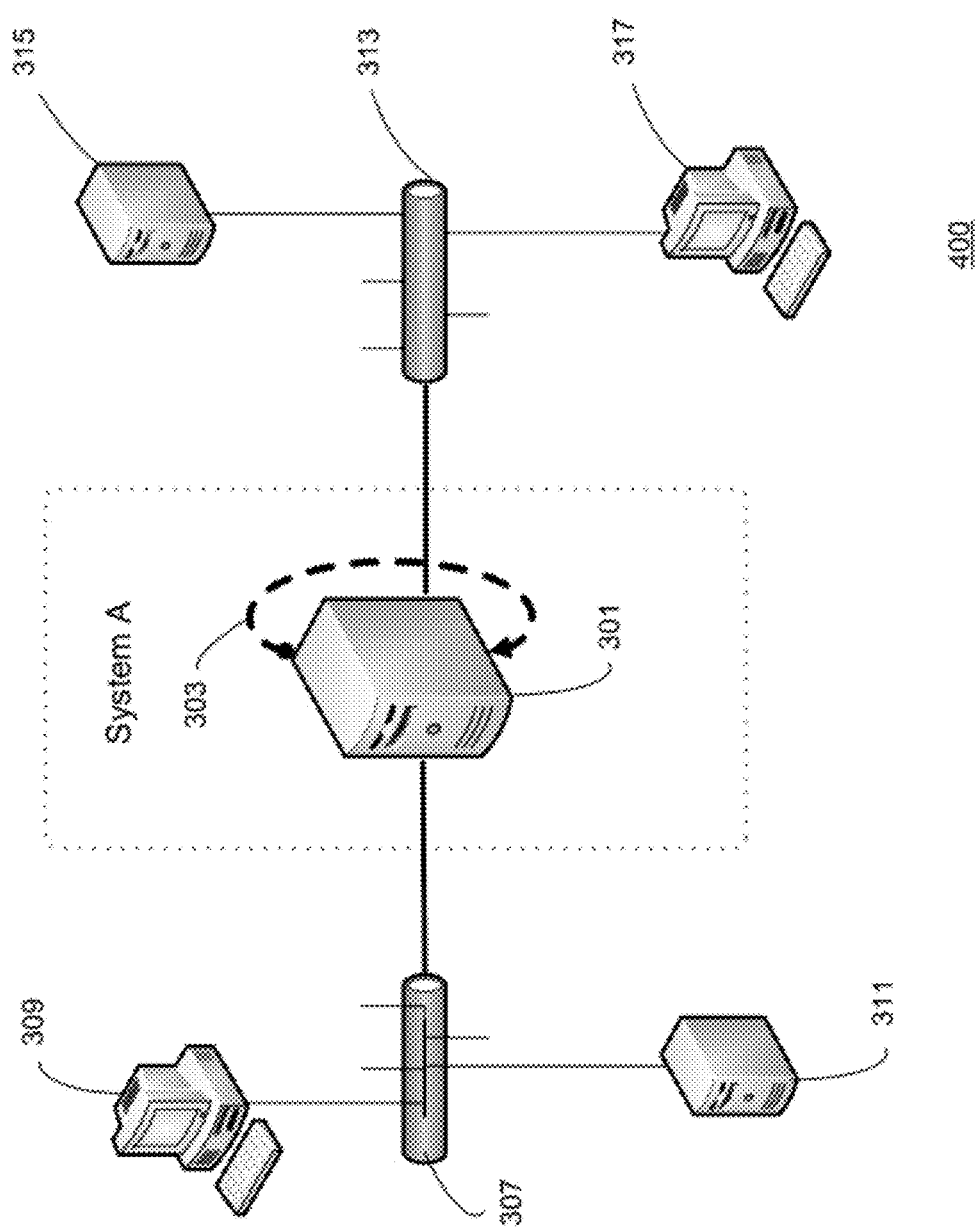
FIG. 4A illustrates a network diagram of an exemplary unidirectional secure data transfer system 400 in accordance with at least one embodiment of the invention.

FIG. 4A illustrates a network diagram of one exemplary embodiment of a unidirectional secure data transfer system 400 in accordance with at least one embodiment of the invention. The unidirectional secure data transfer system 400 may operate on various operating systems or computing platform types, including Microsoft Windows and the Unix-based operating systems (e.g., Solaris, Ultrix and Linux).

Referring to FIG. 4A, source network 307 can be attached to workstation 309, server 311 and computing system 301. Further, destination network 313 can be connected to workstation 317, server 315 and computing system 301. Unidirectional link 303 can be used to connect (unsecure) source network 307 and (secure) destination network 313. In this embodiment, computing system 301 can be partitioned to provide both an unsecure computing environment to source network 307 and a secure computing environment to destination network 313. Computing system 301 can have a single 1 U enclosure or a 2 U enclosure system.

The unidirectional data link 303 can be implemented to ensure that data is only transferred in one direction such that it is physically impossible to transfer data of any kind in the reverse direction. The source network 307 can be connected to the destination network 313 via the unidirectional link 303 and/or computing system 301. In an embodiment, the destination network 313 can be located on a secure or isolated network in order to ensure that any data located on the secure side is protected from any sort of threats that may be located external to the destination network 313 (for example on the source network 307 side).

The unidirectional data link 303 may use any transmission medium type; e.g. fiber optic cabling, any wired cabling, and any wireless link type(s). Furthermore, the unidirectional data link 303 may also use any shielded twisted-pair cabling, any copper cabling, and/or encrypted wireless data links.

For example, the unidirectional data link 303 may be based on different wireless technologies, such as CDMA, WCDMA, TDMA, FDMA, OFDM, Bluetooth, IR, or the like, or other protocols that may be used in a wireless communications network or a data communications network. In an embodiment, the unidirectional link can be implemented to physically connect the busses of two separate partitions of the same computing system (e.g. computing system 301). Accordingly, the illustrations provided herein are not intended to limit the embodiments of the invention and are merely to aid in the description of aspects of embodiments of the invention.

Referring back to FIG. 4A, the components of the unidirectional secure data transfer system 400 and interrelation of the elements of the exemplary embodiments of the invention are not limited to the configuration illustrated. System 400 is merely exemplary and can include any system that allows any computing devices, such as computing system 301, to communicate between and among each other and/or between and among components connected via the unidirectional data link 303. Further, the source network 307 and/or destination network 313 may include any number of networks and/or any number of devices attached to each network and/or any other type of computing devices. For example, the unidirectional link 303 may include a plurality of unidirectional data links (e.g., unidirectional bus links) connecting one or more transmitting bus bridges 321 and/or one or more receiving bus bridges 331, in one or more devices and/or systems.

Figure 4B:
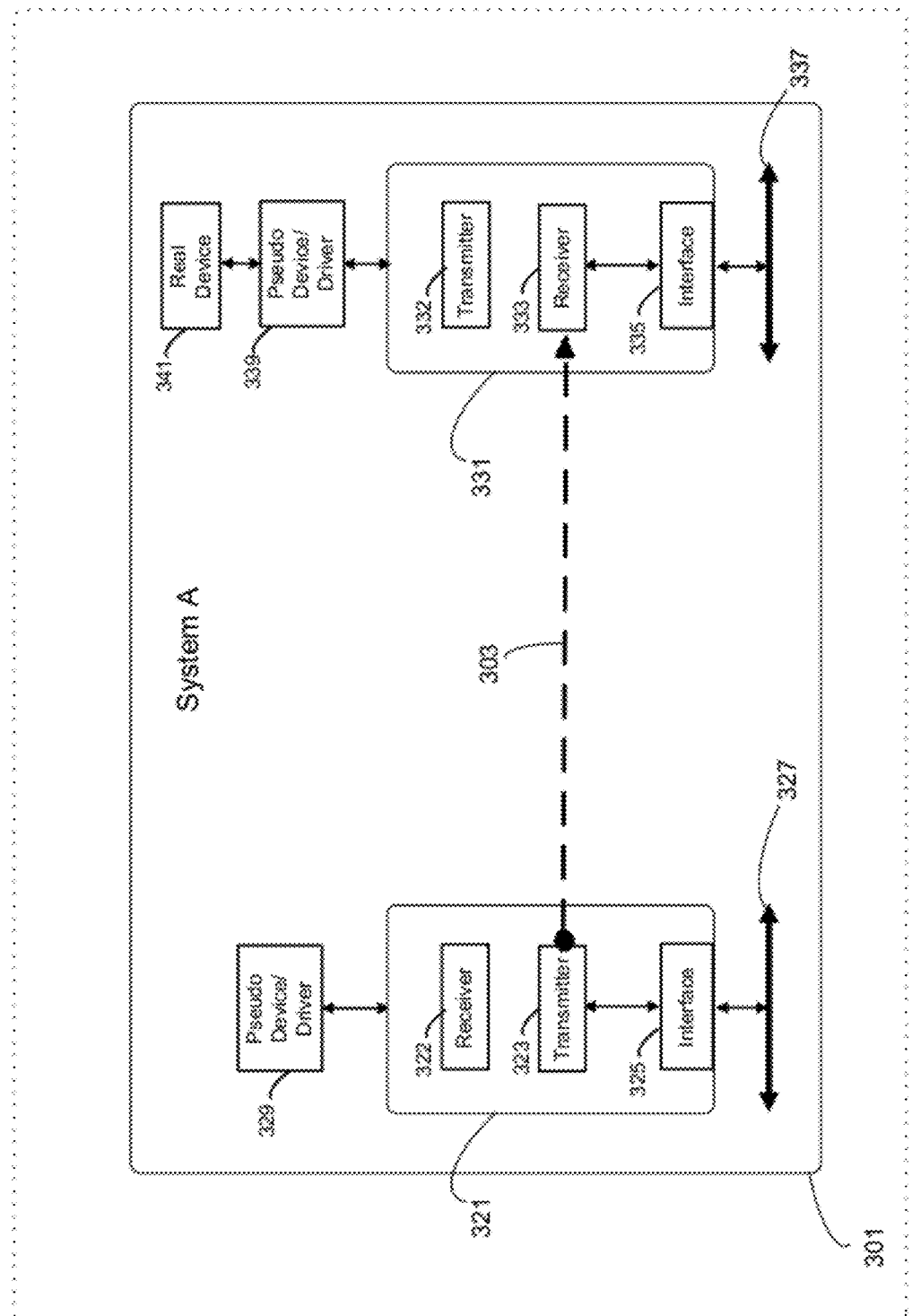
FIG. 4B illustrates an example of a block diagram of the exemplary computing system 301 of FIG. 4A in more detail.

FIG. 4B illustrates an example of a block diagram of the computing system 301 of FIG. 4A in more detail.

Referring to FIG. 4B, a user and/or software program of computing system 301 can transfer data from an unsecure partition of computing system 301 via the unidirectional link 303 to any device attached to the destination network 313; however, the unsecure partition of computing system 301 cannot receive data from the destination network 313 via the unidirectional link 303.

Computing system 301 can include a transmitting bus bridge 321, a bus 327, pseudo device/drivers 329, a receiving bus bridge 331, a bus 337, pseudo/drivers device 339 and a real device 341. The transmitting bus bridge 321 can be used to connect to the receiving bus bridge 331 yielding a connection between one partition (unsecure) of computing system 301 and another partition (secure) of computing system 301 across link 303.

In an embodiment, the transmitting bus bridge 321 may be configured to be a transmit-only device and/or the receiving bus bridge 331 may be configured to be a receive-only device.

Figure 10A:
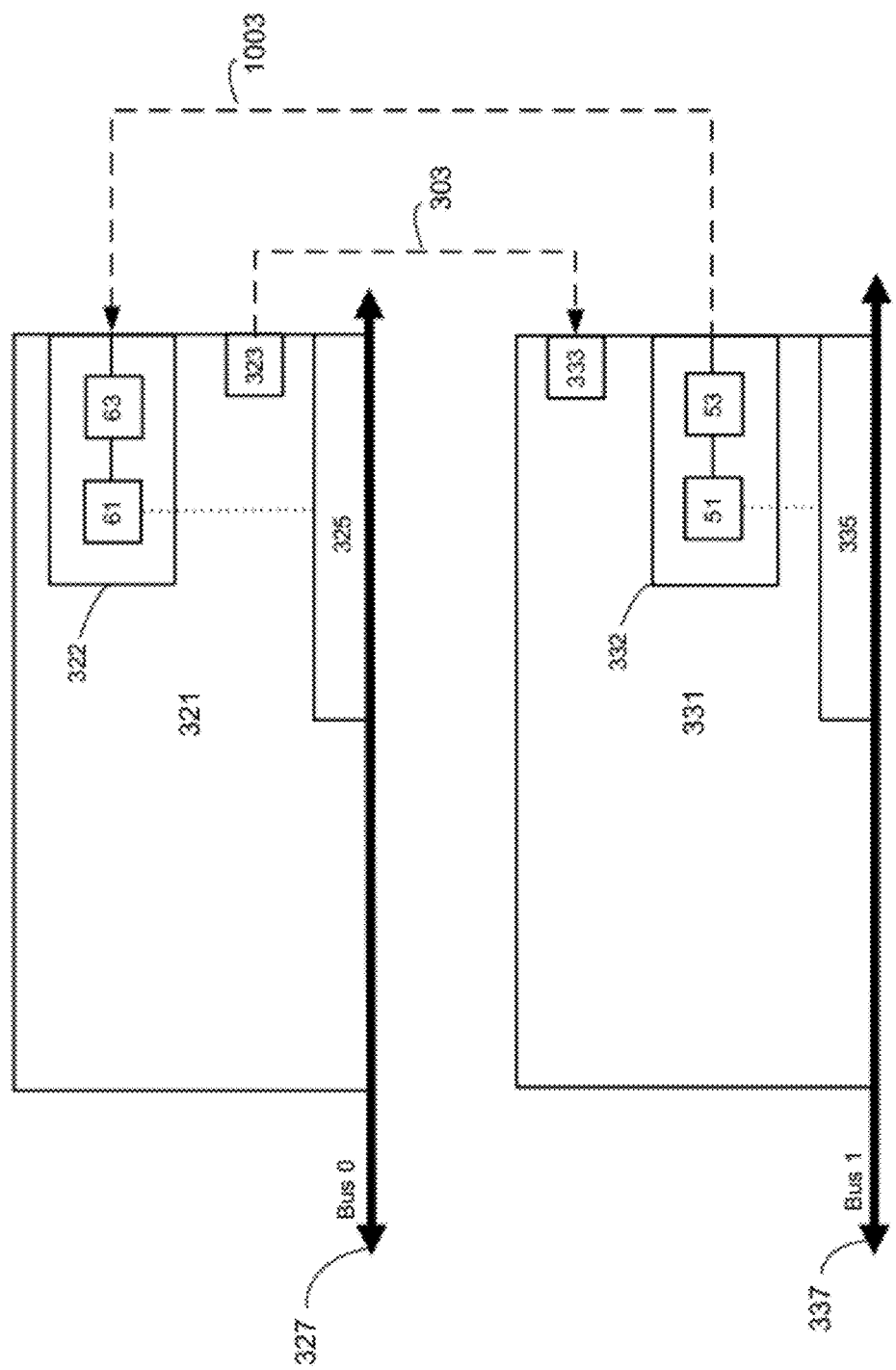
FIG. 10A illustrates an example of a block diagram of the exemplary transmitting bus bridge 321 and the exemplary receiving bus bridge 331 of FIGS. 3B-3C and 4B-4C in more detail.
Figure 10B:
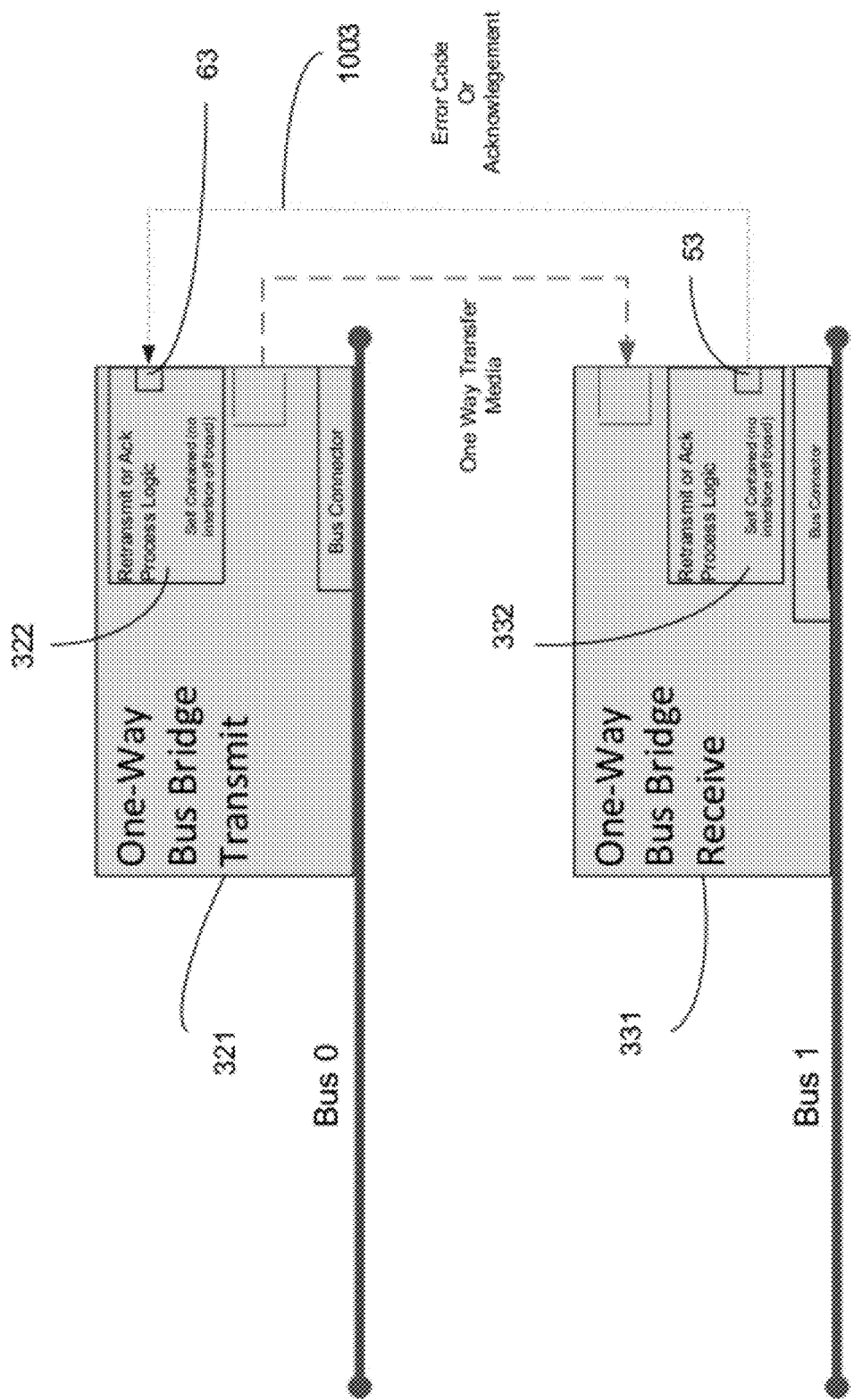
FIG. 10B illustrates an example of a block diagram of the exemplary transmitting bus bridge 321 and the exemplary receiving bus bridge 331 of FIGS. 3B-3C and 4B-4C in more detail.

In another embodiment, the transmitting bus bridge 321 may be configured to be a transmit/receive device and/or the receiving bus bridge 331 may be configured to be a transmit/receive device such that data may be sent from the transmitting bus bridge 321 to the receiving bus bridge 331, and a small quantity of data (i.e. an acknowledgement) may be sent from the receiving bus bridge 331 to the transmitting bus bridge 321 via link 303 or via another unidirectional link (shown in FIG. 10A as 1003).

The transmitting bus bridge 321 can connect to computing system 301 via the bus 327. In an embodiment, the transmitting bus bridge 321 can include a COTS circuit board. In another embodiment, the transmitting bus bridge 321 can include a custom-made circuit board.

The bus 327 can provide bus data transmissions for the unsecure partition of computing system 301. The bus 327 can also be isolated from the secure partition of computing system 301 including bus 337. Further, the bus 327 can provide an unsecure computing environment for computing system 301 and any devices attached to bus 327.

Pseudo-device/drivers 329 may allow an application to interact with any devices/systems attached to the bus 327. In an embodiment, pseudo-device/drivers 329 may allow an application to interact with the transmitting bus bridge 321 via bus 327. Pseudo-device/drivers 329 may include custom written software drivers for system 400. Pseudo-device/drivers 329 can include a single pseudo-device/driver and/or a multiple number of pseudo-devices/drivers. Further, pseudo-device/drivers 329 can interact with a single transmitting bus bridge 321 or a plurality of transmitting bus bridges 321. Pseudo-device/drivers 329 can be stored/executed within processor 351, memory 354 and/or mass storage 359 (Shown in FIG. 4C).

The transmitting bus bridge 321 can include a transmitting bus bridge (TBB) transmitter 323, an interface 325 and a TBB receiver 322. The interface 325 can provide a direct or indirect connection between the bus 327 and the transmitting bus bridge 321. The interface 325 can also provide a direct or indirect connection between the bus 327 and the TBB transmitter 323. The interface 325 can include any standard bus connection such as, for example, PCI, PCI Express, mini-PCI Express, Infiniband, and/or FPGA.

Pinouts can be utilized in order to provide electrical contact between one or more electrical devices. In an embodiment, pinouts can be located in/on the transmitting bus bridge 321 (within the interface 325, TBB transmitter 323 and/or TBB receiver 322) and/or in/on the bus 327. In an example embodiment, the physical receive pin-outs on the transmit bus may not be connected such that no data can be received on the transmit board and that the physical transmit pin-outs on the receive bus are not connected such that no data can be transmitted.

The TBB transmitter 323 can include any optical, wired and wireless transmitters. The TBB receiver 322 can include any optical, wired and wireless receivers.

In an embodiment, the unidirectional data link 303 can be implemented to ensure that data is only transferred in one direction such that it is physically impossible to transfer data of any kind in the reverse direction. For example, the transmitting bus bridge 321 can be arranged not to receive any data from the receiving bus bridge 331. In an embodiment, the TBB receiver 322 may not be connected to any pinouts or may not be connected to a sufficient number of pinouts to provide proper electrical contact. In another embodiment, the TBB receiver 322 may not contain any pinouts or may not contain a sufficient number of pinouts to provide proper electrical contact. In yet another embodiment, the transmitting bus bridge 321 may not contain a receiver. In another embodiment, the TBB receiver 322 may have its pinouts disabled.

Computing system 301 can also include a receiving bus bridge 331, a bus 337, a pseudo device 339 and a real device 341. The receiving bus bridge 331 can connect to computing system 301 via the bus 337. In an embodiment, the receiving bus bridge 331 can include a COTS circuit board. In another embodiment, the receiving bus bridge 331 can include a custom-made circuit board.

The bus 337 can provide bus data transmissions for the secure partition of computing system 301. The bus 337 can also be isolated from the unsecure partition of computing system 301 including bus 327. Further, the bus 337 can provide a secure computing environment for computing system 301 and any devices attached to bus 337.

Pseudo-device/drivers 339 may allow application(s) to interact with any devices/systems attached to the bus 337. In an embodiment, pseudo-device/drivers 339 may allow application(s) to interact with the receiving bus bridge 331 via bus 337. In an embodiment, pseudo-device/drivers 339 may also allow application(s) to interact with any real devices 341 via bus 337. For example, the real devices 341 may include video cards, sound cards, network cards, memory cards, and/or disks. Pseudo-device/drivers 339 may include custom written software drivers for system 400. Pseudo-device/drivers 339 can include a single pseudo-device/driver and/or a multiple number of pseudo-device/drivers. Further, pseudo-device/drivers 339 can interact with a single receiving bus bridge 331 or a plurality of receiving bus bridges 331. In an embodiment, pseudo-device/drivers 339 may also allow real devices 341 to interact with the receiving bus bridge 331 via bus 337. Pseudo-device/drivers 339 can be executed within processor 361, memory 364 and/or mass storage 369 (shown in FIG. 4C).

In an embodiment, any applications on the receiving side can interface with any of the real devices 341 via the local bus 337. Real devices 341 can be mapped by a mapper to any number of pseudo-device/drivers 339. The applications can communicate with the real devices 341 and can create a transparent user experience even though any data delivered from the real devices 341 to the applications came from a totally different partition of computing system 301 or bus 327 via transmitting bus bridge 321 and receiving bus bridge 331.

The receiving bus bridge 331 can include a receiving bus bridge (RBB) receiver 333, an interface 335 and a RBB transmitter 332. The interface 335 can provide a direct or indirect connection between the bus 337 and the receiving bus bridge 331. The interface 335 can also provide a direct or indirect connection between the bus 337 and the RBB receiver 333. The interface 335 can include any standard bus connection such as, for example, PCI, PCI Express, mini-PCI Express, Infiniband, and/or FPGA.

Pinouts can be utilized in order to provide electrical contact between one or more electrical devices. In an embodiment, pinouts can be located in/on the receiving bus bridge 331 (within the interface 335, RBB receiver 333 and/or RBB transmitter 332) and/or in/on the bus 337.

The RBB receiver 333 can include any optical, wired and wireless receivers. The RBB transmitter 332 can include any optical, wired and wireless transmitters.

In an embodiment, the unidirectional data link 303 can be implemented to ensure that data is only transferred in one direction such that it is physically impossible to transfer data of any kind in the reverse direction. For example, the receiving bus bridge 331 can be arranged not to transmit any data to the transmitting bus bridge 321. In an embodiment, the RBB transmitter 332 may not be connected to any pinouts or may not be connected to a sufficient number of pinouts to provide proper electrical contact. In another embodiment, the RBB transmitter 332 may not contain any pinouts or may not contain a sufficient number of pinouts to provide proper electrical contact. In yet another embodiment, the receiving bus bridge 331 may not contain a transmitter. In another embodiment, the RBB transmitter 332 may have its pinouts disabled.

Figure 4C:
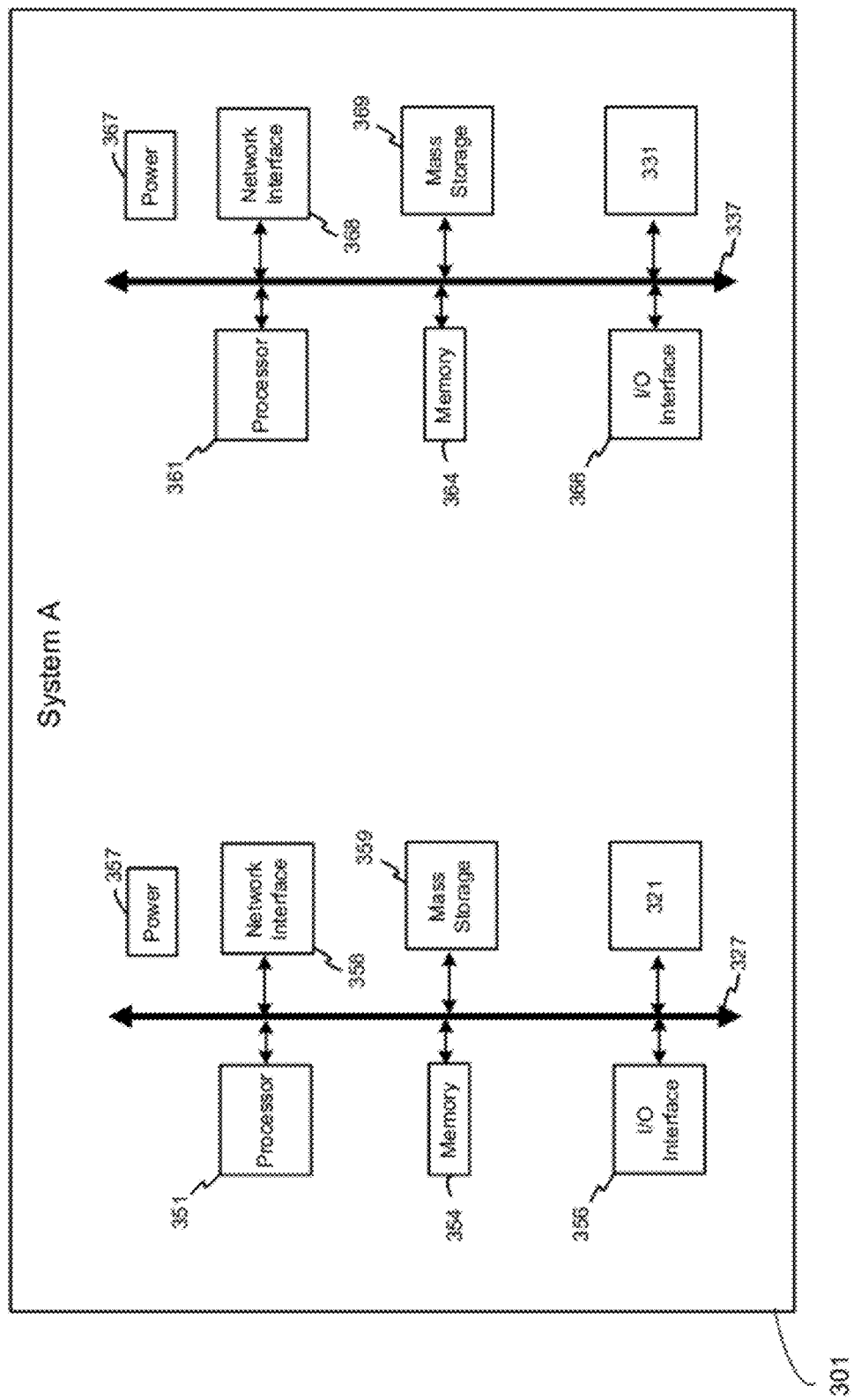
FIG. 4C illustrates an example of a block diagram of the exemplary embodiment(s) of FIGS. 4A-4B in more detail.

FIG. 4C illustrates an example of a block diagram of the exemplary embodiment(s) of FIGS. 4A-4B in more detail.

Referring to FIG. 4C, the computing system 301 may include a first (unsecure) partition that can include a processor 351, a system bus 327, a mass storage unit 359, an Input/Output (I/O) interface 356, a memory unit 354, a network interface 358, and a power unit 357. The processor 351 may interface with memory 354 and the mass storage unit 359 via the system bus 327. The memory 354 and/or the mass storage unit 359 may contain executable instructions and data for implementing various operations for performing the operation of computing system 301 described herein. The network interface 358 may interface with the processor 351 over the system bus 327, and can provide an interface for communication with any available external networks. Transmitting bus bridge 321 may be connected to system bus 327 such that the system bus 327 may provide access to other unsecure areas of computing system 301. The I/O interface 356 may be provided to permit a user to interface with any external buttons of the unsecure partition of computing system 301 such as a standard QWERTY keyboard/keypad and/or control stick/mouse. For example, the processor 351 may be an x86 based CPU, and utilize any operating system which may include varieties of the Windows, Unix and/or Linux operating systems. Computing system 301 may also use high-level analysis software packages and/or custom software written in any programming and/or scripting languages.

The memory 354 can include an application specific integrated circuit ("ASIC"), or other processor, microprocessor, logic circuit, or other data processing device. The ASIC or other processor can execute an application programming interface ("API") layer that interfaces with any resident programs in the memory 354 of the device. The memory 354 can be comprised of read-only or random-access memory (RAM and ROM), EEPROM, flash cards, or any memory common to computer platforms.

Computing system 301 may also include a second (secure) partition that can include a processor 361, a system bus 337, a mass storage unit 369, an I/O interface 366, a memory unit 364, a network interface 368, and a power unit 367. The processor 361 may interface with memory 364 and the mass storage unit 369 via the system bus 337. The memory 364 and/or the mass storage unit 369 may contain executable instructions and data for implementing various operations for performing the operation of computing system 301 described herein. The network interface 368 may interface with the processor 361 over the system bus 337, and can provide an interface for communication with any available external networks. Receiving bus bridge 331 may be connected to system bus 337 such that the system bus 337 may provide access to other secure areas of computing system 301. The I/O interface 366 may be provided to permit a user to interface with any external buttons of the secure partition of computing system 301 such as a standard QWERTY keyboard/keypad and/or control stick/mouse. For example, the processor 361 may be an x86 based CPU, and utilize any operating system which may include varieties of the Windows, Unix and/or Linux operating systems. Computing system 301 may also use high-level analysis software packages and/or custom software written in any programming and/or scripting languages.

The memory 364 can include an ASIC, or other processor, microprocessor, logic circuit, or other data processing device. The ASIC or other processor can execute an API layer that interfaces with any resident programs in the memory 364 of the device. The memory 364 can be comprised of read-only or random-access memory (RAM and ROM), EEPROM, flash cards, or any memory common to computer platforms.

Further, the features of computing system 301 shown in FIG. 4C are to be considered merely illustrative and the invention is not limited to the illustrated features or arrangement.

Figure 5:
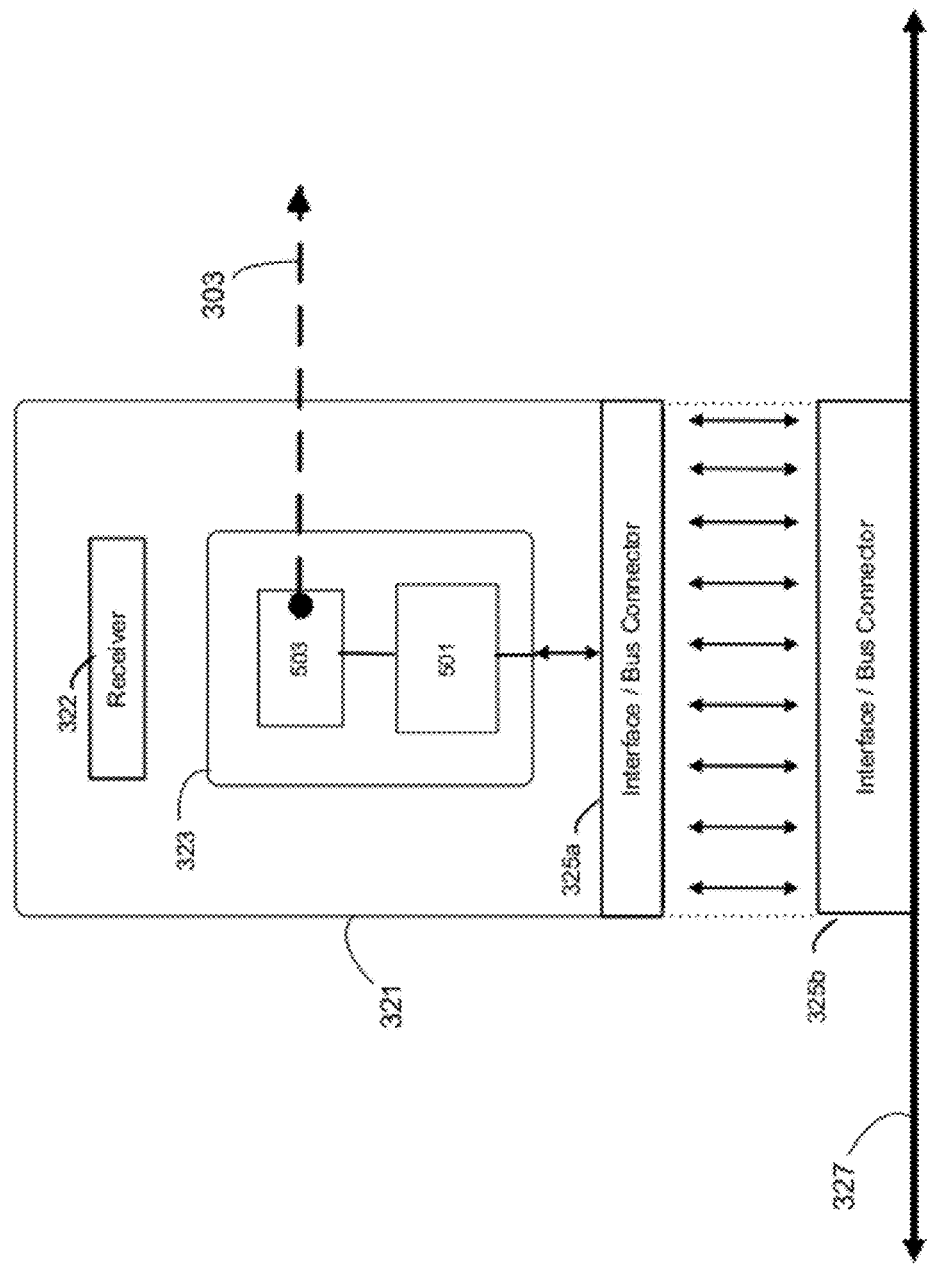
FIG. 5 illustrates an example of a block diagram of the exemplary transmitting bus bridge 321 of FIGS. 3B-3C and 4B-4C in more detail.

FIG. 5 illustrates an example of a block diagram of the exemplary transmitting bus bridge 321 of FIGS. 3B-3C and 4B-4C in more detail.

Referring to FIG. 5, an embodiment of the transmitting bus bridge 321 attaching to bus 327 via interface 325a and 325b is illustrated. The interface 325a and 325b can include any standard bus connector such as, for example, PCI, PCI Express, mini-PCI Express, Infiniband, and/or FPGA. Interface 325a can be attached to transmitting bus bridge 321 and interface 325b can be attached to the bus 327. The transmitting bus bridge 321 can be supported by a pluggable design for modularity.

In an embodiment, the transmitting bus bridge 321 may be configured to be a transmit-only device and/or the receiving bus bridge 331 may be configured to be a receive-only device. For example, when the transmitting bus bridge 321 may be configured to be a transmit-only device, then the TBB receiver 322 (if present) may not be connected to interface 325a, but the TBB transmitter 323 may be attached to interface 325a.

The TBB transmitter 323 can include control logic 501 and Tx transmitter 503. Control logic 501 can be used to perform any physical layer data processing to ensure compliance with the aforementioned bus connector standards. In an embodiment, control logic 501 can be used to convert the electrical signal received from the interface 325a into an optical signal (if Tx transmitter 503 is implemented as an optical transmitter).

Control logic 501 can be connected directly or indirectly to interface 325a and Tx transmitter 503. Tx transmitter 503 can perform any transmitter functions regardless of the medium utilized for unidirectional link 303. For example, Tx transmitter 503 can include at least one optical, wired and/or wireless transmitters.

Further, the features shown in FIG. 5 are to be considered merely illustrative and the invention is not limited to the illustrated features or arrangement.

Figure 6:
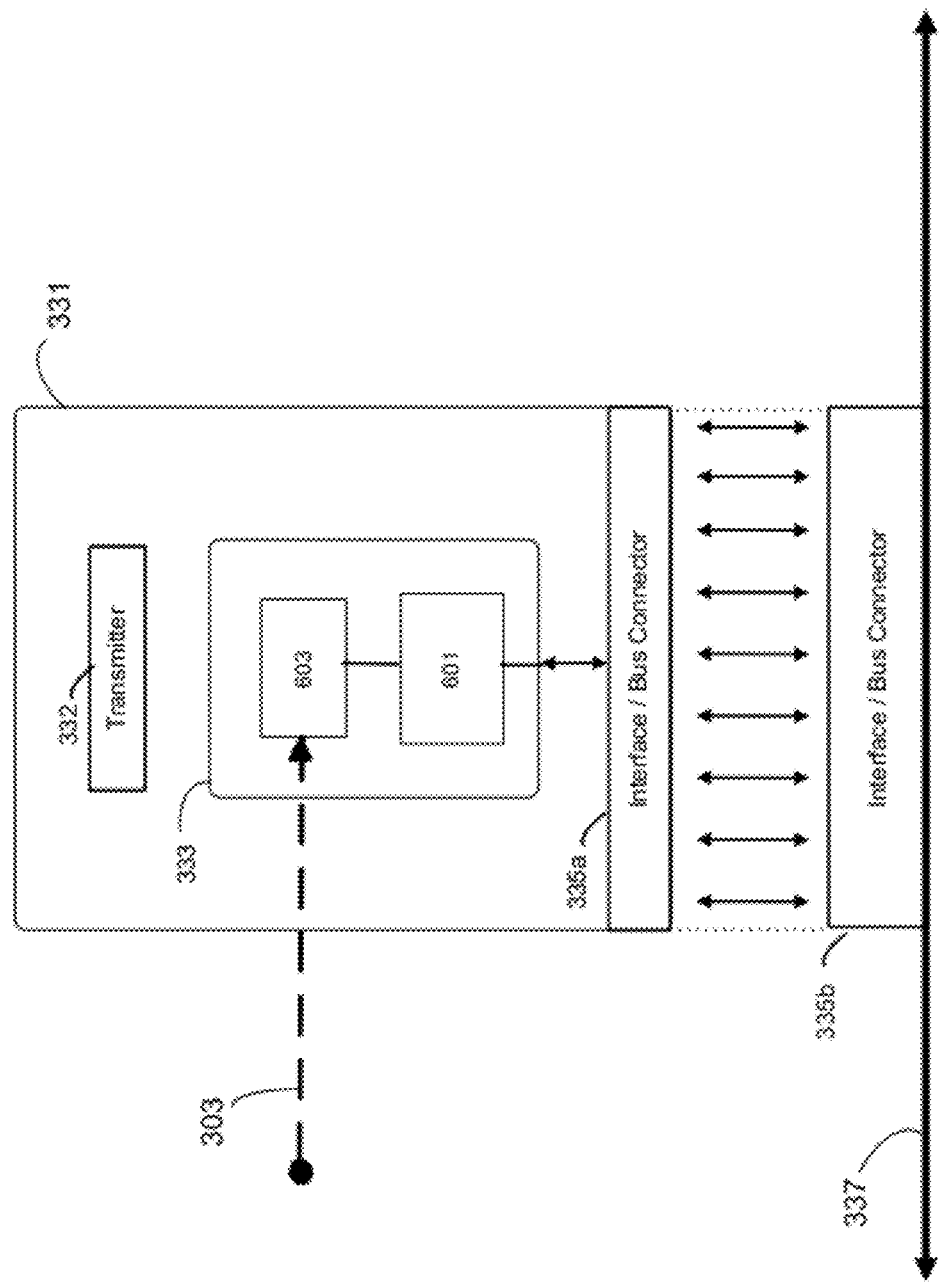
FIG. 6 illustrates an example of a block diagram of the exemplary receiving bus bridge 331 of FIGS. 3B-3C and 4B-4C in more detail.

FIG. 6 illustrates an example of a block diagram of the exemplary receiving bus bridge 331 of FIGS. 3B-3C and 4B-4C in more detail.

Referring to FIG. 6, an embodiment of the receiving bus bridge 331 attaching to bus 337 via interface 335a and 335b is illustrated. The interface 335a and 335b can include any standard bus connector such as, for example, PCI, PCI Express, mini-PCI Express, Infiniband, and/or FPGA. Interface 335a can be attached to receiving bus bridge 331 and interface 335b can be attached to the bus 337. The receiving bus bridge 331 can be supported by a pluggable design for modularity.

In an embodiment, the transmitting bus bridge 321 may be configured to be a transmit-only device and/or the receiving bus bridge 331 may be configured (e.g., will be configured) to be a receive-only device. For example, when the receiving bus bridge 331 may be configured to be a receive-only device, then the RBB transmitter 332 (if present) may not be connected to interface 335a, but the RBB receiver 333 may be attached to interface 335a.

The RBB receiver 333 can include control logic 601 and Rx receiver 603. Control logic 601 can be used to perform any physical layer data processing to ensure compliance with the aforementioned bus connector standards. In an embodiment, control logic 601 can be used to convert the optical signal received from Rx Receiver 603 into an electrical signal (if Rx receiver 603 is implemented as an optical receiver).

Control logic 601 can be connected directly or indirectly to interface 335a and Rx receiver 603. Rx receiver 603 can perform any receiver functions regardless of the medium utilized for unidirectional link 303. For example, Rx receiver 603 can include at least one optical, wired and/or wireless transmitters.

Further, the features shown in FIG. 6 are to be considered merely illustrative and the invention is not limited to the illustrated features or arrangement.

Figure 7:
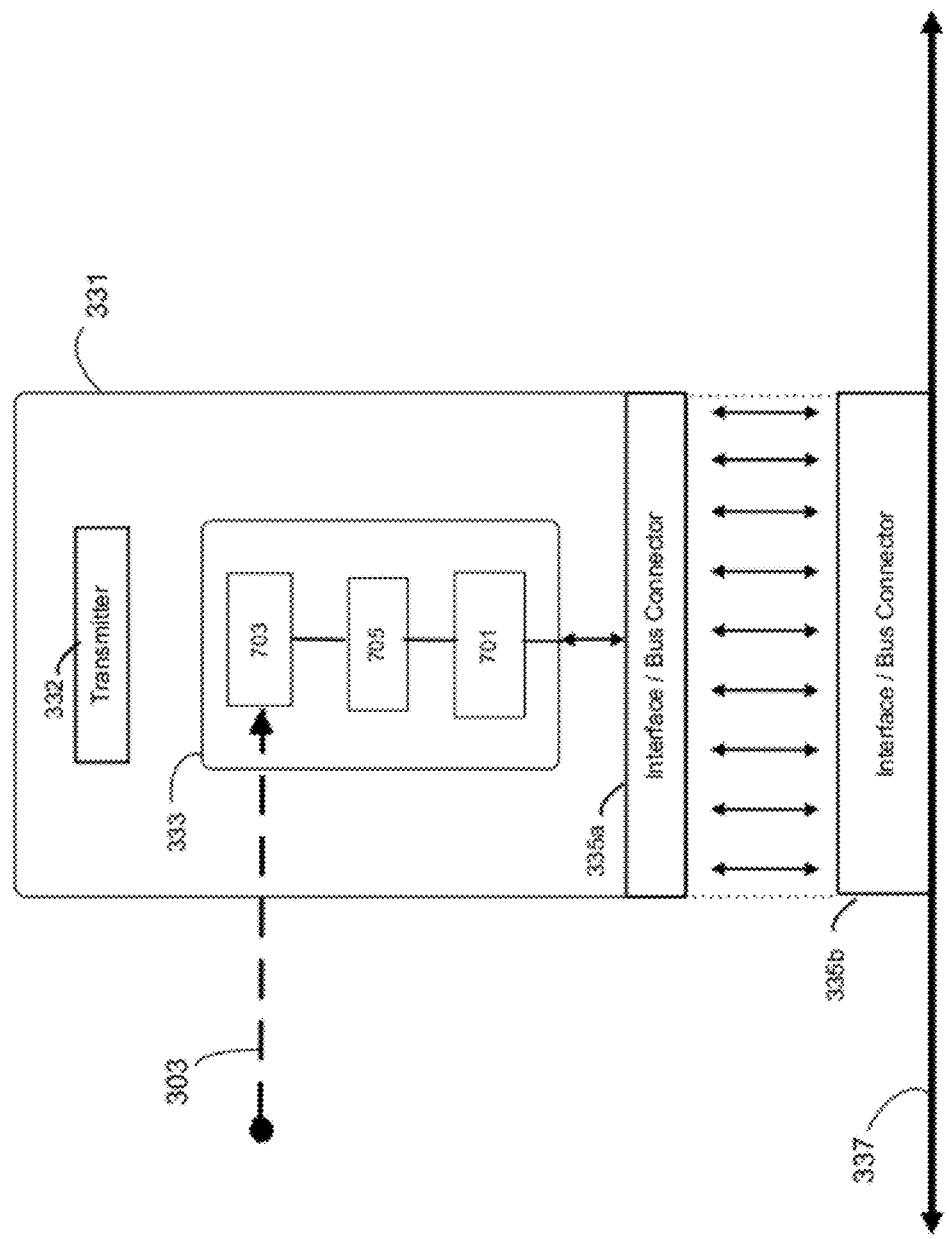
FIG. 7 illustrates an example of a block diagram of the exemplary receiving bus bridge 331 of FIGS. 3B-3C and 4B-4C in more detail.

FIG. 7 illustrates an example of a block diagram of the exemplary receiving bus bridge 331 of FIGS. 3B-3C and 4B-4C in more detail.

Referring to FIG. 7, an embodiment of the receiving bus bridge 331 attaching to bus 337 via interface 335a and 335b is illustrated. The interface 335a and 335b can include any standard bus connector such as, for example, PCI, PCI Express, mini-PCI Express, Infiniband, and/or FPGA. Interface 335a can be attached to receiving bus bridge 331 and interface 335b can be attached to the bus 337. The receiving bus bridge 331 can be supported by a pluggable design for modularity.

In an embodiment, the transmitting bus bridge 321 may be configured to be a transmit-only device and/or the receiving bus bridge 331 may be configured (e.g., will be configured) to be a receive-only device. For example, when the receiving bus bridge 331 may be configured to be a receive-only device, then the RBB transmitter 332 (if present) may not be connected to interface 335a, but the RBB receiver 333 may be attached to interface 335a.

The RBB receiver 333 can include control logic 701, Rx receiver 703 and buffer cache 705. Control logic 701 can be used to perform any physical layer data processing to ensure compliance with the aforementioned bus connector standards. In an embodiment, control logic 701 can be used to convert the optical signal received from Rx Receiver 703 into an electrical signal (if Rx receiver 703 is implemented as an optical receiver).

Control logic 701 can be connected directly or indirectly to interface 335a and buffer cache 705. Rx receiver 703 can be connected directly or indirectly to buffer cache 705. Rx receiver 703 can perform any receiver functions regardless of the medium utilized for unidirectional link 303. For example, Rx receiver 703 can include at least one optical, wired and/or wireless transmitters.

The buffer cache 705 can store any received data from the Rx receiver 703. Further, the buffer cache 705 can also store any data received by receiving bus bridge 331. In an embodiment, RBB receiver 333 may receive a plurality of signals from any number of TBB transmitter(s) 323. For example, a switch (not shown) can be used to support a point-to-multipoint embodiment where a buffer cache 705 can be used to store any received data in order to increase speed and capacity processing. The buffer cache 705 can be used to keep up with the many transmit systems. In an embodiment, PCI Express can allow up to 256 busses in a configuration, such that each PCI express bus can connect to a PCI express bus switch located either internal or external to the computing system 301 and/or computing system 302 yielding a connection up to 256 systems.

The buffer cache 705 may also allow a pseudo-memory device (shown in FIG. 11 as 1103) to be mapped directly to an area of buffer cache 705 specifically for an application or function.

Further, the features shown in FIG. 7 are to be considered merely illustrative and the invention is not limited to the illustrated features or arrangement.

Figure 8:
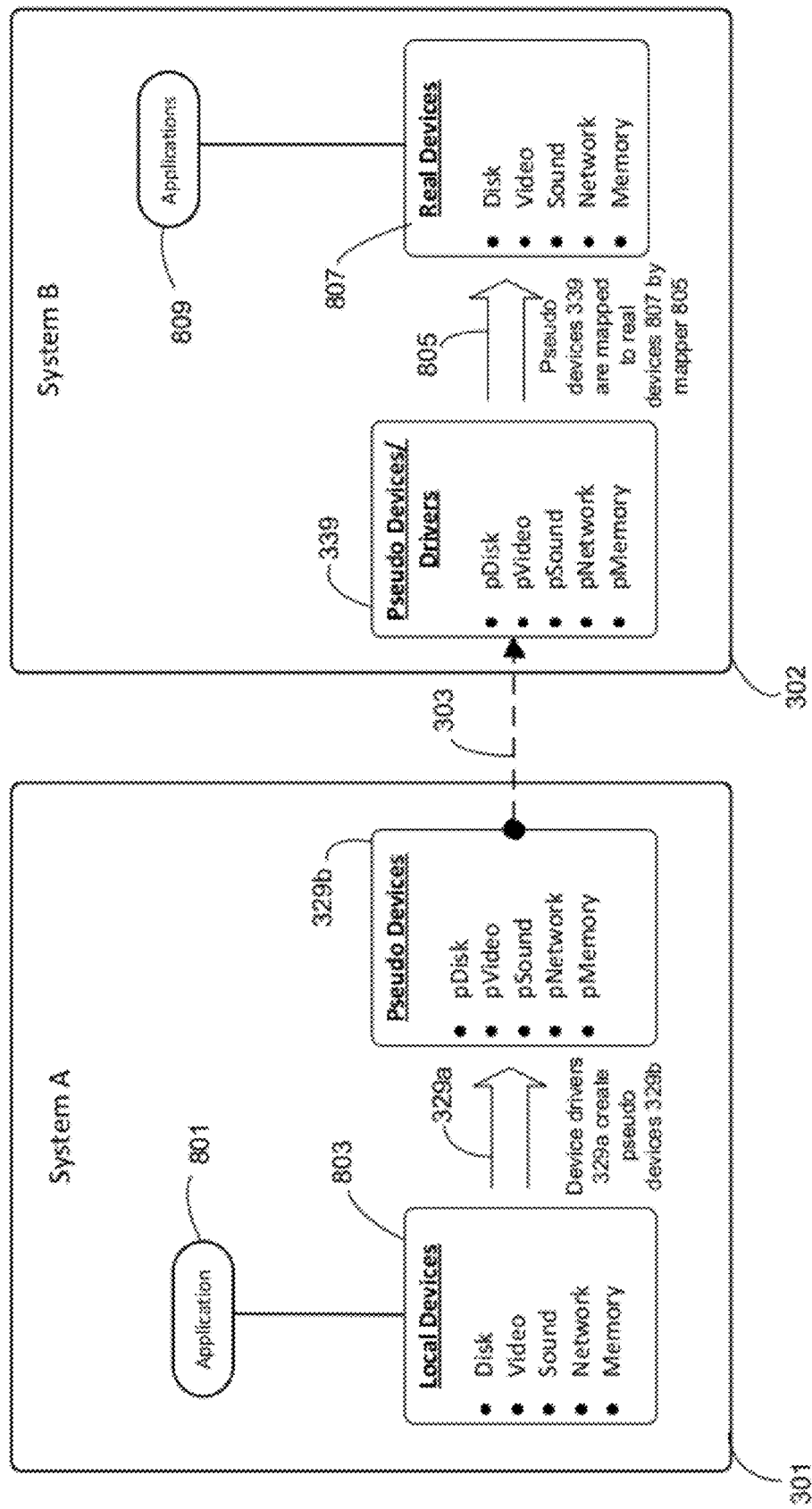
FIG. 8 illustrates an example of system 300 and 400 of the exemplary computing system 301 and exemplary computing system 302 of FIGS. 3A-3C and 4A-4C in more detail.

FIG. 8 illustrates an example of system 300 and 400 of the exemplary computing system 301 and computing system 302 of FIGS. 3A-3C and 4A-4C in more detail.

Referring to FIG. 8, an application 801 may interface with any number of local devices 803 (including disk, video, sound, network or memory). When a user of application 801 attempts to use local devices 803 (e.g. to store data in a disk drive), custom pseudo-device drivers 329a can create pseudo-devices 329b. Each of the local devices 803 (e.g. disk, video, sound, network or memory) can be associated with one or more pseudo-devices 329b (e.g. a pseudo-disk, pseudo-video, pseudo-sound, pseudo-network or pseudo-memory). Further, the association or mapping of local devices 803 to pseudo-devices 329b can be altered based upon the pseudo-devices driver 329a configuration.

The application 801 may now interface with the pseudo-devices 329b/pseudo-device drivers 329a in utilizing the transmitting bus bridge 321 and receiving bus bridge 331 to transfer data across unidirectional link 303. The data may be in native format with minimal processing and overhead added to ensure maximum throughput.

Custom pseudo-devices/drivers 339 may create pseudo-device mapping drivers 805 on local computing system 302. The pseudo-devices/drivers 339 can be mapped to real devices 807 attached to computing system 302 via mapper 805. For example, each of the pseudo-devices 339 (e.g. a pseudo-disk, pseudo-video, pseudo-sound, pseudo-network or pseudo-memory) can be associated with one or more real devices 807 (e.g. disk, video, sound, network or memory). Further, the association or mapping of pseudo-devices 339 to real devices 807 can be altered based upon the pseudo-device drivers 339 configuration.

The data transferred from application 801 can be stored in real device 807 and any applications 809 located on computing system 302 may access the data stored in real devices 807 as if it was originated on computing system 302. Thus, transparency is provided for the user and/or any applications using system 300 and 400.

Further, the features shown in FIG. 8 are to be considered merely illustrative and the invention is not limited to the illustrated features or arrangement.

Figure 9A:
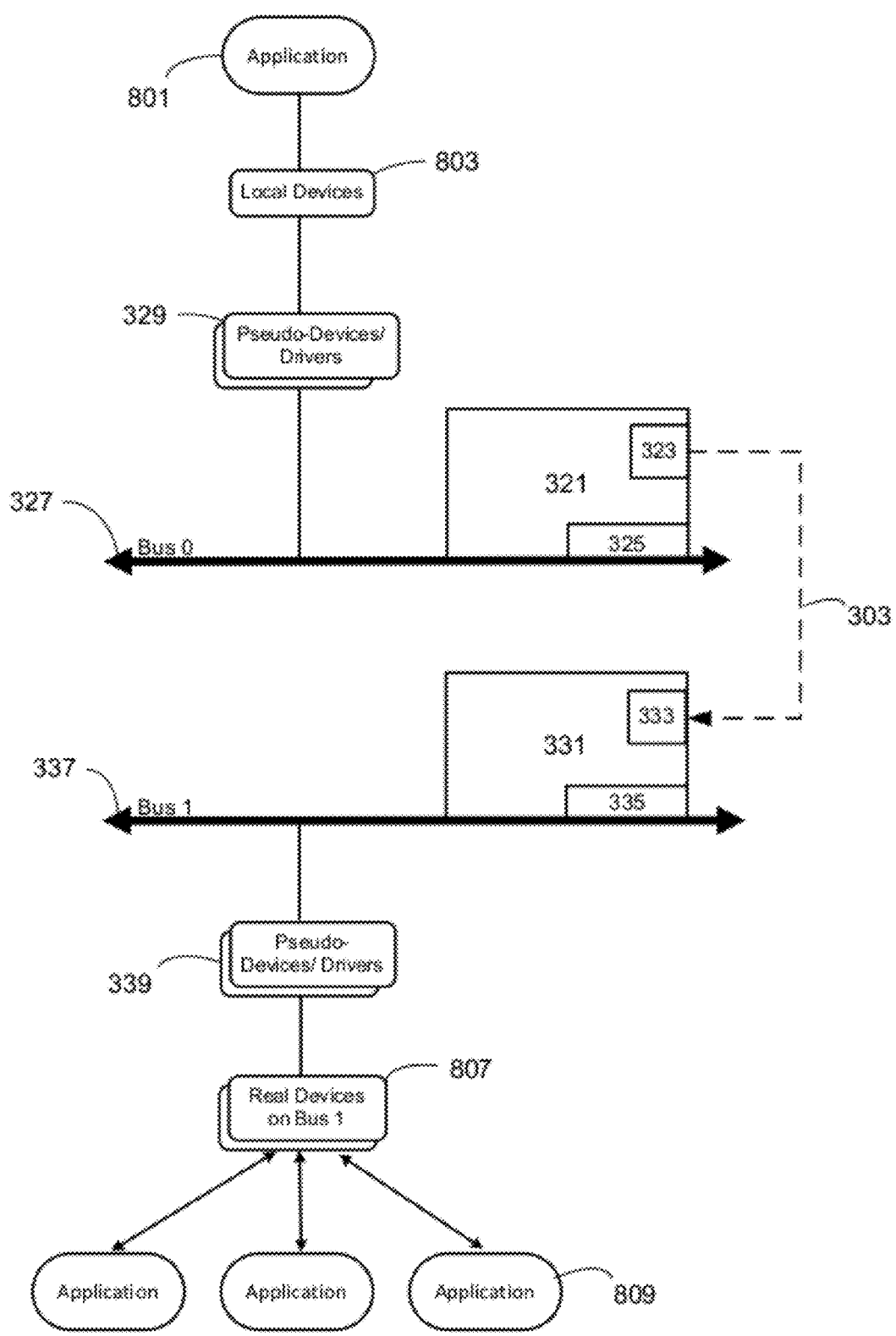
FIG. 9A illustrates an example of system 300 and 400 of the exemplary transmitting bus bridge 321 and exemplary receiving bus bridge 331 of FIGS. 3A-3C, 4A-4C and 8 in more detail.

FIG. 9A illustrates an example of system 300 and 400 of the exemplary transmitting bus bridge 321 and exemplary receiving bus bridge 331 of FIGS. 3A-3C, 4A-4C and 8 in more detail.

Referring to FIG. 9A, application 801 may transfer data from computing system 301 to 302. In another embodiment, application 801 may transfer data from an unsecured partition of computing system 301 to a secure partition of computing system 301. Yet in another embodiment, at least one computing system 301 may transfer data to at least one computing system 302. For example, in another embodiment, at least transmitting bus bridge 321 may transfer data to at least one receiving bus bridge 331. The exemplary embodiments are not limited to a one-to-one relationship and can provide the potential interaction of 1 to N sending devices on a computing system with 1 to N devices/pseudo devices on a receiving computing platform. For example, in this manner, an exemplary embodiment can provide the capability to chain, split or duplicate device channels that can use the one way bus and create a desired application affect.

Application 801 may interface with any number of pseudo-device/drivers 329 configured on the system 300 and/or 400 via the source bus 327.

In an embodiment, transmitting bus bridge 321 can be connected to bus 327. Pseudo-device/drivers 329 may allow application 801 to interact with any devices/systems attached to the bus 327. In an embodiment, pseudo-device/drivers 329 may allow application 801 to interact with the transmitting bus bridge 321 via bus 327. Pseudo-device/drivers 329 may be custom written software drivers for system 300 and/or 400. Pseudo-device/drivers 329 can include a single pseudo-device/driver and/or a multiple number of pseudo-device/drivers. Further, pseudo-device/drivers 329 can interact with a single transmitting bus bridge 321 or a plurality of transmitting bus bridges 321.

The transmitting bus bridge 321 can be connected to the receiving bus bridge 331 via unidirectional link 303. The receiving bus bridge 331 may be connected to bus 337 and the real devices 807 may also be attached to bus 337.

Pseudo-device/drivers 339 may allow application(s) 809 to interact with any devices/systems attached to the bus 337. In an embodiment, pseudo-device/drivers 339 may allow application(s) 809 to interact with the receiving bus bridge 331 via bus 337. In an embodiment, pseudo-device/drivers 339 may also allow application(s) 809 to interact with any real devices 807 via bus 337. For example, the real devices 807 may include video cards, sound cards, network cards, memory cards, and/or disks. Pseudo-device/drivers 339 may be custom written software drivers for system 300 and/or 400. Pseudo-device/drivers 339 can include a single pseudo-device/driver and/or a multiple number of pseudo-device/drivers. Further, pseudo-device/drivers 339 can interact with a single receiving bus bridge 331 or a plurality of receiving bus bridges 331. In an embodiment, pseudo-device/drivers 339 may also allow real devices 807 to interact with the receiving bus bridge 331 via bus 337.

The applications 809 on the receiving side can interface with the real devices 807 on the local bus 337. Real devices 807 can be mapped by mapper 805 to any number of pseudo-device/drivers 339.

The applications 809 can communicate with the real devices 807 and can create a transparent user experience even though the data delivered from the real devices 807 came from a totally different computing system 301 or bus 327 via transmitting bus bridge 321 and receiving bus bridge 331.

In another embodiment, pseudo-device/drivers 329 may be chained together or even split-up to create simultaneous, different application environments. For example, a pseudo-device/driver 329 on the transmitting bus bridge 321 side can split a video feed to the local video driver as well as a second pseudo-device/driver 339 that represents the real device 807 on the receiving bus bridge 331, thereby simultaneously displaying video to both systems (shown as unsecure computing system 301 and secure computing system 302 in FIGS. 3A-3B). In other embodiments, pseudo-device/drivers 329 may be chained together or even split-up to create simultaneous, different application environments for audio, disk drive duplication or other functions that are necessary within the application. This type of chaining and splitting presents configuration capabilities that are not available in current network based one-way transfer technology.

Further, the features shown in FIG. 9A are to be considered merely illustrative and the invention is not limited to the illustrated features or arrangement.

FIG. 10A illustrates an example of a block diagram of the exemplary transmitting bus bridge 321 and the exemplary receiving bus bridge 331 of FIGS. 3B-3C and 4B-4C in more detail.

Referring to FIG. 10A, an embodiment of the transmitting bus bridge 321 attached to bus 327 via interface 325 is illustrated along with the receiving bus bridge 331 attached to bus 337 via interface 335. The transmitting bus bridge 321 and the receiving bus bridge 331 can be attached via a unidirectional link 303. However, the receiving bus bridge 331 can also be connected to the transmitting bus bridge 321 via a unidirectional data link 1003.

In an embodiment, the transmitting bus bridge 321 may be configured to be a transmit/receive device and/or the receiving bus bridge 331 may be configured to be a transmit/receive device such that data may be sent from the transmitting bus bridge 321 to the receiving bus bridge 331. The exemplary embodiment can include self-contained acknowledgement logic such that a small quantity of return data (i.e. an acknowledgement) may be sent from the receiving bus bridge 331 to the transmitting bus bridge 321 via a link 303 or via another unidirectional link 1003. For example, the return data may include the passing of a status code or error byte (described below) from the receiving bus bridge 331 to the transmitting bus bridge 321, functioning as an acknowledgement or status update of successful data transmission. For example, as illustrated in the exemplary embodiment of FIG. 10B, an error code or acknowledgement may be transmitted via a unidirectional link 1003 using self-contained (i.e. no interface off board) retransmit or acknowledgement process logic (e.g., 322, 333).

In an embodiment, the transmitting bus bridge 321 can include a TBB transmitter 323, an interface 325 and a TBB receiver 322. The TBB receiver 322 can include control logic 61 and Rx receiver 63.

Control logic 61 can be used to perform any physical layer data processing to ensure compliance with the aforementioned bus connector standards. In an embodiment, control logic 61 can be used to convert an optical signal received from Rx Receiver 63 into an electrical signal (if Rx receiver 63 is implemented as an optical receiver). Control logic 61 and/or Rx receiver 63 can also be used to determine/interpret/implement the status codes (described below) and whether or not retransmission occurs.

Control logic 62 can be connected directly or indirectly to interface 325 and Rx receiver 63. Rx receiver 63 can perform any receiver functions regardless of the medium utilized for unidirectional link 1003. For example, Rx receiver 63 can include at least one optical, wired and/or wireless transmitters. In another embodiment, control logic 61 can be connected directly or indirectly to Rx receiver 63, but may be self-contained and may not be connected to an interface.

In an embodiment, the receiving bus bridge 331 can include a receiving bus bridge (RBB) receiver 333, an interface 335 and a RBB transmitter 332. The RBB transmitter 332 can include control logic 51 and Tx transmitter 53.

Control logic 51 can be used to perform any physical layer data processing to ensure compliance with the aforementioned bus connector standards. In an embodiment, control logic 51 can be used to convert the electrical signal received from the interface 335 into an optical signal (if Tx transmitter 53 is implemented as an optical transmitter). Control logic 51 and/or Tx transmitter 53 can be used to determine/set/implement the status codes (described below).

Control logic 51 can be connected directly or indirectly to interface 335 and Tx transmitter 53. Tx transmitter 53 can perform any transmitter functions regardless of the medium utilized for unidirectional link 303. For example, Tx transmitter 53 can include at least one optical, wired and/or wireless transmitters. In another embodiment, control logic 51 can be connected directly or indirectly to Tx transmitter 53, but may be self-contained and may not be connected to an interface.

In an embodiment, computing system 301 and 302 can have basic redundancy features which can ensure the safe delivery of data over unidirectional link 303. For example, a status code can be utilized by the system to cause data retransmission. When a user of system 300 and 400 has data to send, the data may be delivered to the transmitting bus bridge 321, and the transmitting bus bridge 321 can transmit the data over unidirectional link 303. Also, when data is sent to the transmitting bus bridge 321, one or more logic gates (e.g. logic gate 51 within TBB transmitter 323 and/or logic gate 61 within TBB receiver 322) can be tripped which can allow the TBB receiver 322 to receive data. In an exemplary embodiment, TBB receiver 322 can contain an acknowledgement/error code processor. The acknowledgement/error code processor can be located within logic gate 61 and/or receiver Rx 63. After data is received by the receiving bus bridge 331, one or more logic gates (e.g. logic gate 61 within RBB receiver 333 and/or logic gate 51 within RBB transmitter 332) can be tripped which can allow the RBB transmitter 332 to transmit data. In an exemplary embodiment, RBB transmitter 332 can contain an acknowledgement/error code generator. The acknowledgement/error code generator can be located within logic gate 51 and/or transmitter Tx 53. Also, after data is received by the receiving bus bridge 331, the receiving bus bridge 331 can transmit a status code to the transmitting bus bridge 321 via unidirectional link 1003. The status code can be a "0" or a "non-zero". The acknowledgement/error code generator can be used to determine/set/implement the status codes. After data is sent by the receiving bus bridge 331, a logic gate (logic gate 61 within RBB receiver 333) can be tripped which can allow the RBB receiver 333 to receive more data.

A status code of "0" can signify that the data transmitted by the transmitting bus bridge 321 was successfully received by the receiving bus bridge 331. When a status code of "0" is received by the transmitting bus bridge 321, the transmitting bus bridge 321 may not retransmit data to the receiving bus bridge 331 via unidirectional link 303, but may transmit new data. For example, when a status code of "0" is received by the transmitting bus bridge 321, one or more logic gates (e.g. logic gate 61 within TBB receiver 322 and/or logic gate 51 within TBB transmitter 323) can be tripped which can allow the TBB transmitter 323 to transmit more data. Control logic 61 (which can include an acknowledgement/error code generator) can be used to determine/interpret/implement the status codes and whether or not retransmission occurs.

A status code of "non-zero" can signify that the data transmitted by the transmitting bus bridge 321 was not successfully received by the receiving bus bridge 331 and/or an error occurred. When a status code of "non-zero" is received by the transmitting bus bridge 321, the transmitting bus bridge 321 can retransmit the data a number of times dependent upon the system configuration. For example, when a status code of "non-zero" is received by the transmitting bus bridge 321, one or more logic gates (e.g. logic gate 61 within TBB receiver 322 and/or logic gate 51 within TBB transmitter 323) can be tripped which can allow the TBB transmitter 323 to retransmit the data a number of times dependent upon the system configuration. However, if the number of retransmits exceeds the maximum allowed configuration, then an error message may be generated on the transmitting bus bridge 321 indicating that there is a problem with the system and it may be delivered to the system administrator of computing system 301 and 302. The configurable number of retransmits can be set, monitored and/or changed by a system administrator of computing system 301 and 302. Control logic 61 (which can include an acknowledgement/error code generator) can be used to determine/interpret/implement the status codes and whether or not retransmission occurs. Control logic 61 can also provide a status update to the pseudo-device driver 329a.

In another embodiment, the status codes can rely on on-board logic contained within control logic 51 and 61 in order to keep the signals self-contained within the transmitting bus bridge 321 and receiving bus bridge 331.

Further, the features shown in FIG. 10A are to be considered merely illustrative and the invention is not limited to the illustrated features or arrangement.

Figure 9B:
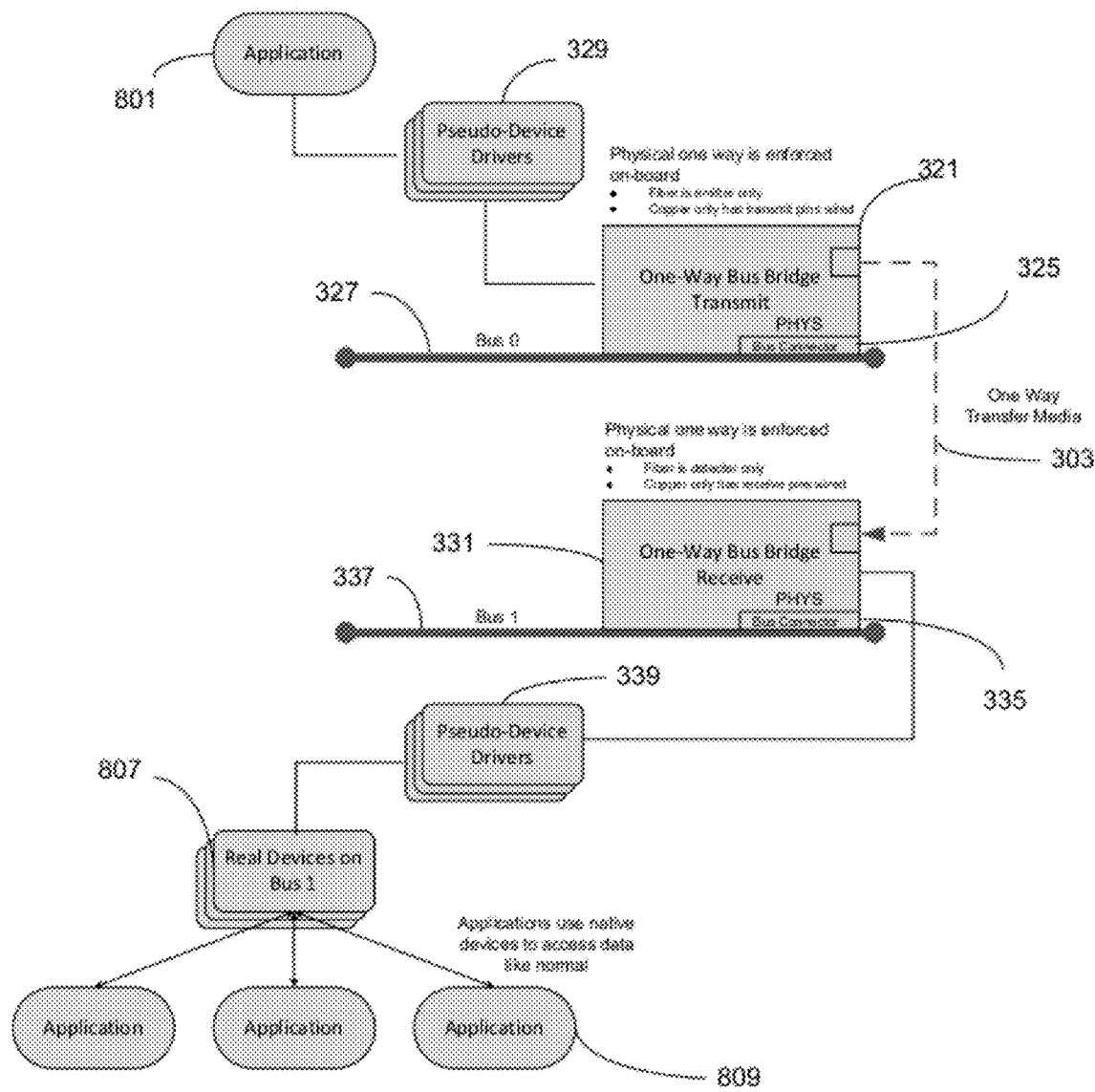
FIG. 9B illustrates another example of system 300 and 400 of the exemplary transmitting bus bridge 321 and exemplary receiving bus bridge 331 of FIGS. 3A-3C, 4A-4C and 8 in more detail.
Figure 11:
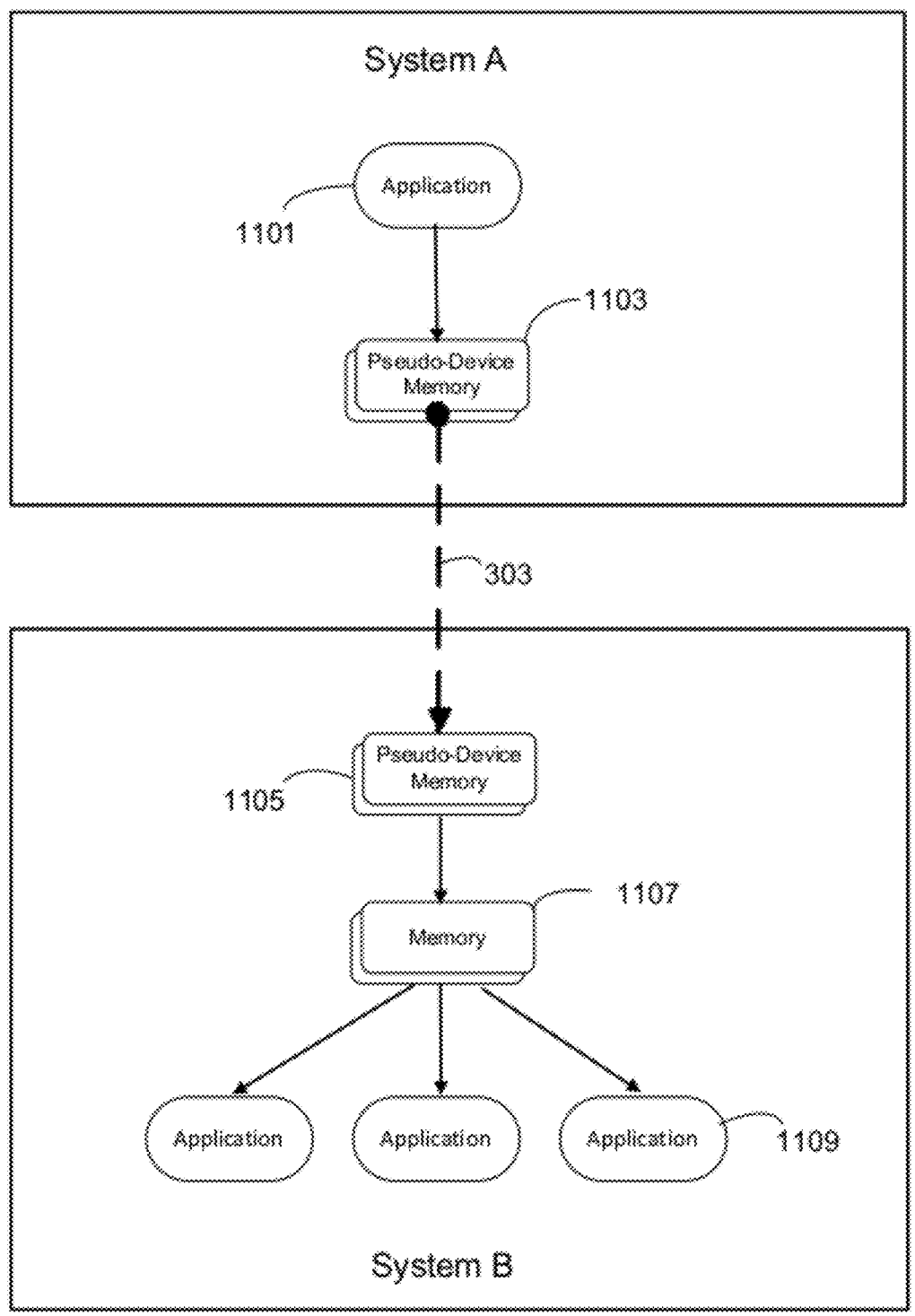
FIG. 11 illustrates an example of system 300 and 400 of the exemplary computing systems 301 and 302 of FIGS. 8 and 9 in more detail.

FIG. 11 illustrates an example of system 300 and 400 of the exemplary computing systems 301 and 302 of FIGS. 8 and 9 in more detail.

Typically, interprocess communications will only occur between applications running on the same platform; however, with the use of the one-way bus bridge system 300 and 400, interprocess communications such as message queues, semaphores or shared memory segments can be implemented across applications running on two different computing platforms. For example, computing system 301 can have an application 1101 currently running, and may write to a shared memory location, semaphore or message queue utilizing a pseudo-device 329 (e.g. pseudo-memory device 1103 in this embodiment). By utilizing the pseudo-memory device 1103, an automatic data transfer can occur via the unidirectional link 303 to computing system 302 (where other applications 1109 may be located). Computing system 302 may have a pseudo-device/driver 339 and/or memory mapper 805 (e.g. pseudo-memory device mapper 1105 in this embodiment) that may provide the memory mapping to real device 807 (e.g. memory 1107 in this embodiment) residing on computing system 302. Thus, the interprocess communications may be located/stored within memory 1107.

Further, the applications 1109 running on computing system 302 may also have interprocess communications through the use of message queues, semaphores or shared memory defined within applications 1109. The applications 1109 may read from memory 1107, which may contain any one of the interprocess communications from computing system 301. Applications 1109 may also be able to process the data stored in memory 1007 as interprocess communications from computing system 301. Therefore, a first application 1101 on one computing system 301 can either control or unidirectionally communicate with a second application 1109 located on a separate computing system 302.

In an embodiment, a simple memory write on a first computing system can transfer raw data across a unidirectional link from the first computing system to another computing system. Further, memory writes can occur at tremendous speeds and an exemplary device may only be slowed by the rest of the hardware on the computing system.

In another embodiment, operating system-level control can be provided from one computing system to another computing system via the one-way bus bridge.

In yet another embodiment, an application (located on one computing system) can provide data, commands or control to another application, a driver or operating system (residing on a separate computing system) through the use of the one-way bus bridge.

In an embodiment, the one-way bus bridge can create pseudo-devices, located on one computing system, which map to real devices located on a completely separate computing system. In another embodiment, the one-way bus bridge can create pseudo-devices including a one-way hard drive, a one-way video card, a one-way sound card, a one-way printer and one-way memory.

Furthermore, the exemplary embodiments disclosed herein can be used to protect Personally Identifiable Information (PII) data, credit card numbers, identifiable information for business transactions, monetary transactions or any transaction that needs to be protected from one system or network.

The exemplary embodiments disclosed herein can also be used for continuance of operation (COOP), disaster recovery or one-way data replication.

The exemplary embodiments disclosed herein can be used for various applications, including Government, SCADA, Financial, and/or Large Corporations.

The exemplary embodiments disclosed herein can provide, for example, Secure Information Sharing, Security and Separation, Data Backups, and/or Database Replication.

The exemplary embodiments disclosed herein can depend from the system bus and not network technology like conventional network-level devices.

Further, the features shown in FIG. 11 are to be considered merely illustrative and the invention is not limited to the illustrated features or arrangement.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a terminal. In the alternative, the processor and the storage medium may reside as discrete components in a terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A one-way bus bridge pair that transfers data securely in a single direction at bus level utilizing bus architecture, the bus bridge pair comprising:
    a transmitting bus bridge;
    a receiving bus bridge;
    a transfer medium connecting the transmitting bus bridge and the receiving bus bridge,
    wherein the receiving bus bridge is arranged in one-way communication with the transmitting bus bridge using bus layer protocol to extend the transmitting bus bridge to the receiving bus bridge across the transfer medium without using network layer protocol, and
    wherein the transmitting bus bridge is devoid of physical capabilities to accept any data from the receiving bus bridge, and the receiving bus bridge is devoid of physical capabilities to send any data to the transmitting bus bridge,
    wherein:
        the transmitting bus bridge includes a transmitter, wherein the transmitter is connected to a first bus via a first interface; and
        the receiving bus bridge includes a receiver, wherein the receiver is connected to a second bus via a second interface allowing the one-way extension of the transmitting bus bridge to the receiving bus bridge,
    wherein:
        the transmitter:
            accepts an input data from the first bus of a first computing device; and
            delivers the input data to the receiver via the one-way communication over the transfer medium utilizing the bus architecture and the bus layer protocol and without using the network layer protocol; and the receiver:
obtains the input data from the first bus via the one-way communication over the transfer medium; and
supplies the input data to the second bus of a second computing device, and wherein the transmitter of the transmitting bus bridge uses a program direct interprocess communication using shared memory between the first computing device and the second computing device.

2. The one-way bus bridge pair of claim 1, wherein the input data comprises at least a command from a device driver.

3. The one-way bus bridge pair of claim 1, wherein the first interface comprises a Peripheral Component Interconnect (PCI) interface.

4. The one-way bus bridge pair of claim 1, wherein the second interface comprises a PCI interface.

5. The one-way bus bridge pair of claim 1, wherein the first interface comprises a Peripheral Component Interconnect Express (PCIe) interface.

6. The one-way bus bridge pair of claim 1, wherein the second interface comprises a PCIe interface.

7. The one-way bus bridge pair of claim 1, wherein the first interface comprises a mini-Peripheral Component Interconnect Express (PCIe) interface.

8. The one-way bus bridge pair of claim 1, wherein the second interface comprises a mini-PCIe interface.

9. The one-way bus bridge pair of claim 1, wherein the first interface comprises an InfiniBand interface.

10. The one-way bus bridge pair of claim 1, wherein the second interface comprises an InfiniBand interface.

11. The one-way bus bridge pair of claim 1, wherein the receiving bus bridge further comprises at least one buffer; and
wherein the buffer is used to store the input data.

12. The one-way bus bridge pair of claim 11, wherein the buffer connects the receiver and the second interface.

13. The one-way bus bridge pair of claim 1, wherein the transmitter is directly connected to the first interface.

14. The one-way bus bridge pair of claim 1, wherein the first bus is directly connected to the first interface.

15. The one-way bus bridge pair of claim 1, wherein the receiver is directly connected to the second interface.

16. The one-way bus bridge pair of claim 1, wherein the second bus is directly connected to the second interface.

17. The one-way bus bridge pair of claim 1,
wherein the transfer medium includes a single direction fiber optic connection connecting the transmitting bus bridge to the receiving bus bridge for the one-way communication utilizing the bus architecture and the bus layer protocol and without using the network layer protocol.

18. The one-way bus bridge pair of claim 1,
wherein the transfer medium includes a single direction copper cable connection connecting the transmitting bus bridge to the receiving bus bridge for the one-way communication utilizing the bus architecture and the bus layer protocol and without using the network layer protocol.

19. The one-way bus bridge pair of claim 1,
wherein the transfer medium includes a single direction wireless connection connecting the transmitting bus bridge to the receiving bus bridge for the one-way communication utilizing the bus architecture and the bus layer protocol and without using the network layer protocol.

20. The one-way bus bridge pair of claim 2, wherein the device driver supports a UNIX-based operating system.

21. The one-way bus bridge pair of claim 2, wherein the device driver supports a Linux-based operating system.

22. The one-way bus bridge pair of claim 2, wherein the device driver supports a Microsoft Windows-based operating system.

23. The one-way bus bridge pair of claim 2, wherein the device driver supports an Apple-based operating system.

24. The one-way bus bridge pair of claim 1, wherein the secure data comprises Personally Identifiable Information (PII).

25. The one-way bus bridge pair of claim 1, wherein the secure data comprises Secure Disk Replication.

26. The one-way bus bridge pair of claim 1, wherein the secure data comprises Secure Database Backup.

27. The one-way bus bridge pair of claim 1, wherein the secure data comprises continuance of operation (COOP) data.

28. The one-way bus bridge pair of claim 1, wherein the secure data comprises Secure Network Access.

29. The one-way bus bridge pair of claim 1, wherein the transmitter includes a controlling device, wherein the controlling device controls the one-way communication between the transmitting bus bridge and the receiving bus bridge utilizing the bus architecture and the bus layer protocol and without using the network layer protocol.

30. The one-way bus bridge pair of claim 1, wherein the receiver includes a controlling device, wherein the controlling device controls the one-way communication between the transmitting bus bridge and the receiving bus bridge utilizing the bus architecture and the bus layer protocol and without using the network layer protocol.

31. The one-way bus bridge pair of claim 29, wherein the controlling device includes a logic device.

32. The one-way bus bridge pair of claim 30, wherein the controlling device includes a logic device.

33. The one-way bus bridge pair of claim 31, wherein the logic device includes a field programmable gate array (FPGA).

34. The one-way bus bridge pair of claim 32, wherein the logic device includes a field programmable gate array (FPGA).

35. A one-way bus bridge pair that transfers data securely in a single direction at bus level utilizing bus architecture, the bus bridge pair comprising:
a transmitting bus bridge;
a receiving bus bridge; and
a transfer medium connecting the transmitting bus bridge and the receiving bus bridge,
wherein the receiving bus bridge is arranged in one-way communication with the transmitting bus bridge using bus layer protocol to extend the transmitting bus bridge to the receiving bus bridge across the transfer medium without using network layer protocol, and
wherein the transmitting bus bridge is devoid of physical capabilities to accept any data from the receiving bus bridge, and the receiving bus bridge is devoid of physical capabilities to send any data to the transmitting bus bridge,
wherein:
the transmitting bus bridge includes a transmitter, wherein the transmitter is connected to a first bus via a first interface; and
the receiving bus bridge includes a receiver, wherein the receiver is connected to a second bus via a second interface allowing the one-way extension of the transmitting bus bridge to the receiving bus bridge,
wherein:
the transmitter:
accepts an input data from the first bus of a first computing device; and
delivers the input data to the receiver via the one-way communication over the transfer medium utilizing the bus architecture and the bus layer protocol and without using the network layer protocol; and
the receiver:
obtains the input data from the first bus via the one-way communication over the transfer medium; and
supplies the input data to the second bus of a second computing device,
wherein the input data comprises at least a command from a device driver, and
wherein the device driver includes at least a pseudo-device.

36. The one-way bus bridge pair of claim 35, wherein the pseudo-device includes at least a disk drive.

37. The one-way bus bridge pair of claim 35, wherein the pseudo-device includes at least a memory device.

38. The one-way bus bridge pair of claim 35, wherein the pseudo-device includes at least an audio device.

39. The one-way bus bridge pair of claim 35, wherein the pseudo-device includes at least a video device.

40. The one-way bus bridge pair of claim 35, wherein the pseudo-device includes at least a network device.

41. The one-way bus bridge pair of claim 35, wherein the pseudo-device includes at least a memory mapping device.

42. A one-way bus bridge pair that transfers secure data in a single direction at bus level utilizing bus architecture, the bus bridge pair comprising:
a transmitting bus bridge;
a receiving bus bridge;
a transfer medium connecting the transmitting bus bridge and the receiving bus bridge,
wherein the receiving bus bridge is arranged in direct one-way communication with the transmitting bus bridge using bus layer protocol to extend the transmitting bus bridge to the receiving bus bridge across the transfer medium without using network layer protocol, and
wherein the transmitting bus bridge is physically prohibited from accepting any data from the receiving bus bridge, and the receiving bus bridge is physically prohibited from sending any data to the transmitting bus bridge; and
a second transfer medium connecting the transmitting bus bridge and the receiving bus bridge,
wherein the receiving bus bridge is arranged to have a second, direct one-way communication with the transmitting bus bridge using the bus layer protocol to extend the receiving bus bridge to the transmitting bus bridge across the second transfer medium without using network layer protocol, and
wherein the receiving bus bridge is physically prohibited from accepting any data from the transmitting bus bridge via the second, direct one-way communication, and the transmitting bus bridge is physically prohibited from sending any data via the second, direct one-way communication to the receiving bus bridge.

43. The one-way bus bridge pair of claim 42, wherein:
the transmitting bus bridge includes a transmitter, wherein the transmitter is connected to a first bus via a first interface; and
the receiving bus bridge includes a receiver, wherein the receiver is connected to a second bus via a second interface allowing the one-way extension of the transmitting bus bridge to the receiving bus bridge.

44. The one-way bus bridge pair of claim 42, wherein:
the transmitter:
accepts an input data from the first bus of a first computing device; and
delivers the input data to the receiver via the direct one-way communication utilizing the bus architecture and the bus layer protocol and without using the network layer protocol; and
the receiver:
accepts the input data from the first bus via the direct one-way communication utilizing the bus architecture and the bus layer protocol and without using the network layer protocol; and
delivers the input data to the second bus of a second computing device.

45. The one-way bus bridge pair of claim 44, wherein the input data comprises at least a command from a device driver.

46. The one-way bus bridge pair of claim 42, wherein the second, direct one-way communication carries at least an acknowledgement data type.

47. The one-way bus bridge pair of claim 42, wherein the second, direct one-way communication is controlled by at least a controlling device.

48. The one-way bus bridge pair of claim 47, wherein the controlling device includes at least a logic device.

49. The one-way bus bridge pair of claim 42, wherein the second, direct one-way communication at the bus level carries at least an error code data type.

50. The one-way bus bridge pair of claim 46, wherein the acknowledgement data type causes a retransmission of data across the direct one-way communication utilizing the bus architecture and the bus layer protocol and without using the network layer protocol.

51. The one-way bus bridge pair of claim 46, wherein the acknowledgement data type includes at least a single byte of data.

52. The one-way bus bridge pair of claim 49, wherein the error code data type causes a retransmission of data across the direct one-way communication utilizing the bus architecture and the bus layer protocol and without using the network layer protocol.

53. The one-way bus bridge pair of claim 49, wherein the error code data type includes at least a single byte of data.

54. A secure one-way bus bridge system for one-way bus level communication utilizing bus architecture and bus layer protocol, the system comprising:
a transmitting bus bridge;
a receiving bus bridge;
a transfer medium connecting the transmitting bus bridge and the receiving bus bridge,
wherein the receiving bus bridge is arranged in one-way communication with the transmitting bus bridge using the bus layer protocol to extend the transmitting bus bridge to the receiving bus bridge across the transfer medium without using the network layer protocol, and
wherein the transmitting bus bridge is physically arranged not to accept any data from the receiving bus bridge, and the receiving bus bridge is physically arranged not to send any data to the transmitting bus bridge; and
a second transfer medium connecting the transmitting bus bridge and the receiving bus bridge,
wherein the receiving bus bridge is arranged to have a second, direct one-way communication with the transmitting bus bridge using the bus layer protocol to extend the receiving bus bridge to the transmitting bus bridge across the second transfer medium without using network layer protocol, and wherein the receiving bus bridge is physically prohibited from accepting any data from the transmitting bus bridge via the second, direct one-way communication, and the transmitting bus bridge is physically prohibited from sending any data via the second, direct one-way communication to the receiving bus bridge.

55. The one-way bus bridge system of claim 54, wherein:
the transmitting bus bridge includes a transmitter, wherein the transmitter is connected to a first bus via a first interface; and
the receiving bus bridge includes a receiver, wherein the receiver is connected to a second bus via a second interface allowing the one-way extension of the transmitting bus bridge to the receiving bus bridge.

56. The one-way bus bridge system of claim 55, wherein:
the transmitter:
   accepts an input data from the first bus of a first part of a computing device; and
   delivers the input data to the receiver; and
the receiver:
   obtains the input data from the first bus; and
   supplies the input data to the second bus of a second part of the computing device.

57. A method of securely transporting data in native format one-way across two or more computing systems at bus level utilizing bus architecture and bus layer protocol, comprising:
providing a transmitting bus bridge;
providing a receiving bus bridge; and
providing a transfer medium connecting the transmitting bus bridge and the receiving bus bridge;
arranging the receiving bus bridge in one-way communication with the transmitting bus bridge using the bus layer protocol to extend the transmitting bus bridge to the receiving bus bridge across the transfer medium without using the network layer protocol;
physically arranging the transmitting bus bridge not to accept any data from the receiving data to the transmitting bus bridge,
   wherein the transmitting bus bridge includes a transmitter, and the receiving bus bridge includes a receiver,
connecting the transmitter to a first bus via a first interface;
connecting the receiver to a second bus via a second interface;
receiving an input data from the first bus of a first part of a computing device;
sending the input data to the receiver;
receiving the input data from the first bus; and
sending the input data to the second bus of a second part of the computing device.

58. The method of claim 57, further comprising:
receiving an input data from the first bus of a first computing device;
sending the input data to the receiver;
receiving the input data from the first bus; and
sending the input data to the second bus of a second computing device.

59. The one-way bus bridge pair of claim 1, wherein the transmitter of the transmitting bus bridge uses one-way native format communication to the second computing device.

60. A one-way bus bridge pair that transfers data securely in a single direction utilizing bus architecture, the bus bridge pair comprising:

a transmitting bus bridge including a transmitter that is connected to a first bus of a first computing device via a first interface;
a receiving bus bridge including a receiver that is connected to a second bus of a second computing device via a second interface allowing one-way extension of the transmitting bus bridge to the receiving bus bridge; and
a transfer medium connecting the transmitter of the transmitting bus bridge and the receiver of the receiving bus bridge,
wherein the receiver is arranged in one-way communication with the transmitter using bus layer protocol to extend the first bus to the second bus across the transfer medium without using network layer protocol,
wherein the transmitter is devoid of physical capabilities to accept any data from the receiver, and the receiver is devoid of physical capabilities to send any data to the transmitter,
wherein the transmitter includes a first controller programmed to control the transmission of data to the receiver, wherein the first controller is programmed to accept an input data from the first bus and deliver the input date to the receiver via the one-way communication over the transfer medium utilizing the bus architecture and the bus layer protocol and without using the network layer protocol,
wherein the receiver includes a second controller programmed to control the receiver to receive the data from the transmitter, wherein the second controller is programmed to obtain the input data from the first bus via the one-way communication over the transfer medium and supply the input data to the second bus utilizing the bus architecture and the bus layer protocol and without using the network layer protocol, and
wherein the transmitter of the transmitting bus bridge uses a program direct interprocess communication using shared memory between the first computing device and the second computing device.

61. The one-way bus bridge pair of claim 35, further comprising:
a second transfer medium connecting the transmitting bus bridge and the receiving bus bridge,
wherein the receiving bus bridge is arranged to have a second, direct one-way communication with the transmitting bus bridge using the bus layer protocol to extend the receiving bus bridge to the transmitting bus bridge across the second transfer medium without using network layer protocol, and
wherein the receiving bus bridge is physically prohibited from accepting any data from the transmitting bus bridge via the second, direct one-way communication, and the transmitting bus bridge is physically prohibited from sending any data via the second, direct one-way communication to the receiving bus bridge.

62. The one-way bus bridge pair of claim 42, wherein the transmitter of the transmitting bus bridge uses a program direct interprocess communication using shared memory between the first computing device and the second computing device.

63. The one-way bus bridge pair of claim 54, wherein the transmitter of the transmitting bus bridge uses a program direct interprocess communication using shared memory between the first computing device and the second computing device.

* * * * *